United States Patent
Sato

(10) Patent No.: US 8,310,423 B2
(45) Date of Patent: Nov. 13, 2012

(54) LIQUID CRYSTAL DISPLAY DEVICE AND HEAD-UP DISPLAY

(75) Inventor: Masatoshi Sato, Hashima (JP)

(73) Assignee: Epson Imaging Devices Corporation, Azumino (JP)

(*) Notice: Subject to any disclaimer, the term of this patent is extended or adjusted under 35 U.S.C. 154(b) by 949 days.

(21) Appl. No.: 12/367,668

(22) Filed: Feb. 9, 2009

(65) Prior Publication Data

US 2009/0225242 A1 Sep. 10, 2009

(30) Foreign Application Priority Data

Mar. 5, 2008 (JP) ................................ 2008-055590
Mar. 5, 2008 (JP) ................................ 2008-055602

(51) Int. Cl.
*G09G 3/36* (2006.01)
(52) U.S. Cl. ........................................................ 345/88
(58) Field of Classification Search ................. None
See application file for complete search history.

(56) References Cited

U.S. PATENT DOCUMENTS

| | | | | |
|---|---|---|---|---|
| 6,069,605 A * | 5/2000 | Ozawa | ............................ | 345/98 |
| 6,392,620 B1 * | 5/2002 | Mizutani et al. | ............... | 345/88 |
| 8,089,452 B2 * | 1/2012 | Kawai | ............................ | 345/107 |
| 2002/0024511 A1 * | 2/2002 | Ozawa | ............................ | 345/204 |
| 2002/0084969 A1 * | 7/2002 | Ozawa | ............................ | 345/96 |
| 2005/0062904 A1 * | 3/2005 | Shimoshikiryoh | ............. | 349/89 |
| 2008/0036751 A1 * | 2/2008 | Yamazaki | ..................... | 345/205 |
| 2008/0106660 A1 * | 5/2008 | Kitayama et al. | ............... | 349/39 |
| 2009/0225242 A1 * | 9/2009 | Sato | ................................ | 349/11 |

FOREIGN PATENT DOCUMENTS

| | | |
|---|---|---|
| JP | A-2001-272657 | 10/2001 |
| JP | A-2003-140113 | 5/2003 |
| JP | A-2003-177716 | 6/2003 |
| JP | A-2003-295105 | 10/2003 |
| JP | A-2003-345314 | 12/2003 |
| KR | 10-2007-0039508 | 4/2007 |
| WO | WO 2006/003609 A1 | 1/2006 |

* cited by examiner

*Primary Examiner* — Peter Vincent Agustin
(74) *Attorney, Agent, or Firm* — Oliff & Berridge, PLC

(57) ABSTRACT

A liquid crystal display device includes pixels each including a liquid crystal and a pixel electrode and a common electrode that are used for applying a voltage to the liquid crystal, a display unit in which a plurality of the pixels is disposed in a matrix shape, and even light sources. The pixels are driven in accordance with sequential light emission of the even light sources, and the application direction of a voltage for driving the liquid crystal is changed for each of vertical scanning periods corresponding to the number of the even light sources.

14 Claims, 15 Drawing Sheets

LIQUID CRYSTAL DISPLAY DEVICE AND HEAD-UP DISPLAY

BACKGROUND

1. Technical Field

The present invention relates to a liquid crystal display device and a head-up display, and more particularly, to a liquid crystal display device and a head-up display that use a field-sequential driving method in which a plurality of light sources sequentially emits light.

2. Related Art

Generally, liquid crystal display devices using a field-sequential driving method in which a plurality of light sources sequentially emits light have been known (for example, see JP-A-2003-295105).

In JP-A-2003-295105, a liquid crystal display device (head-up display) that includes light sources of light emitting diodes of two types having relationship of complementary colors and a liquid crystal display device has been disclosed. In JP-A-2003-295105, color display is performed by field-sequential driving in which a color image is recognized through an afterimage effect of human eyes by having the light sources of the light emitting diodes of two types to emit light alternately.

However, in the liquid crystal display device disclosed in JP-A-2003-295105, there are two (even) types of the light sources of the light emitting diodes, and thus, when inversion driving in which the application direction of a voltage applied to the liquid crystal is alternately changed each time light emission of the light sources of the light emitting diodes changes is performed, the application direction of the voltage applied to the liquid crystal is the same all the time in a case where one color between two types is displayed. Accordingly, while one image is continuously displayed, a voltage having a same application direction is continuously applied to the liquid crystal of a pixel corresponding to the image. As a result, there is a problem that burn-in and a decrease in reproducibility of colors of the liquid crystal occur.

SUMMARY

An advantage of some aspects of the invention is that it provides a liquid crystal display device capable of suppressing burn-in and a decrease in reproducibility of colors.

According to a first aspect of the invention, there is provided a liquid crystal display device including: pixels each including a liquid crystal and a pixel electrode and a common electrode that are used for applying a voltage to the liquid crystal; a display unit in which a plurality of the pixels is disposed in a matrix shape; and even light sources. The pixels are driven in accordance with sequential light emission of the even light sources, and the application direction of a voltage for driving the liquid crystal is changed for each of vertical scanning periods corresponding to the number of the even light sources.

According to the above-described liquid crystal display device, as described above, by configuring the application direction of the voltage for driving the liquid crystal to be changed for each vertical scanning periods corresponding to the number of the even light sources, when a same light source among the even light sources is to emit light next time, the application direction of the voltage for driving the liquid crystal is changed. Accordingly, it can be prevented that the application direction of the voltage applied to the liquid crystal of the pixel at a time when a same light source emits light is the same all the time. Therefore, burn-in and a decrease in reproducibility of colors of the liquid crystal can be suppressed. In addition, when a video signal for a same image is input to the pixel, the brightness of the color displayed in the pixel changes due to a change in the electric potential difference generated between before and after the change in the application direction of the voltage for driving the liquid crystal. However, in such a case, by repeatedly changing the application direction of the voltage for driving the liquid crystal, the brightness can be averaged.

In the above-described liquid crystal display device, it is preferable that the even light sources include a first light source that emits light of a first color and a second light source that emit light of a second color that is different from the first color, and a period in which the first light source and the second light source sequentially emit light once is set as one unit period, and the application direction of the voltage for driving the liquid crystal is changed for each unit period. In such a case, after the first light source and the second light source sequentially emit light, the application direction of the voltage for driving the liquid crystal is changed. Accordingly, when the first light source and the second light source emit light next time, the application direction of the voltage applied to the liquid crystal of the pixel can be changed. Therefore, it can be prevented that the application direction of the voltage applied to the liquid crystal is the same all the time, and thereby burn-in and a decrease in reproducibility of colors of the liquid crystal can be suppressed.

In the above-described liquid crystal display device, it may be configured that a voltage applied to the common electrode is a constant voltage, and the voltage applied to the pixel electrode is shifted between a high electric potential and a low electric potential with respect to the voltage applied to the common electrode for each of the vertical scanning periods corresponding to the number of the even light sources. In such a case, DCCOM driving in which the voltage applied to the common electrode is constant and the voltage applied to the pixel electrode is shifted between the high electric potential and the low electric potential can be performed. Accordingly, by employing the above-described configuration, burn-in and a decrease in reproducibility of colors of the liquid crystal can be suppressed in DCCOM driving.

In the above-described liquid crystal display device, the voltage applied to the common electrode may be configured to be shifted between a high electric potential and a low electric potential for each of the vertical scanning periods corresponding to the number of the even light sources. In such a case, ACCOM driving in which the voltage applied between the common electrode and the pixel electrode is shifted between the high electric potential and the low electric potential can be performed. Therefore, by employing the above-described configuration, burn-in and a decrease in reproducibility of colors of the liquid crystal in ACCOM driving can be suppressed.

In the above-described liquid crystal display device, the application direction of the voltage applied to the liquid crystal may be configured to be changed for each horizontal line of the plurality of the pixels that is disposed in the matrix shape. In such a case, line-inversion driving in which the voltage applied to the liquid crystal is changed for each horizontal line can be performed. Accordingly, by using the above-described configuration, burn-in and a decrease in reproducibility of colors of the liquid crystal in line-inversion driving can be suppressed.

In the above-described liquid crystal display device, it is preferable that the colors of light emitted by the first light source and the second light source are different colors selected from among red, green, and blue colors. Under such a configuration, a color image can be displayed in an easy manner by additive color mixing.

According to a second aspect of the invention, there is provided a head-up display including the above-described liquid crystal display device. Under the above-described configuration, a head-up display capable of suppressing burn-in and a decrease in reproducibility of colors of the liquid crystal can be acquired.

According to a third aspect of the invention, there is provided a liquid crystal display device including: pixels each including a liquid crystal and a pixel electrode and a common electrode that are used for applying a voltage to the liquid crystal; a display unit in which a plurality of the pixels is disposed in a matrix shape; and even light sources. The pixels are driven in accordance with sequential light emission of the even light sources, and the application direction of the voltage applied to the liquid crystal is changed for each one vertical scanning period, and the light sources emitting light are changed for each of even vertical scanning periods.

According to the above-described liquid crystal display device, as described above, by configuring the application direction of the voltage applied to the liquid crystal to be changed for each one vertical scanning period and the light sources emitting light to be changed for each even vertical scanning period, the application direction of the voltage is changed for each one vertical scanning period. In addition, between even vertical scanning periods in which one vertical scanning period is repeated, light sources of the same color emit light, and voltages having different application directions are applied during a period in which the light sources of the same color emit light. Accordingly, it can be prevented that the application direction of the voltage applied to the liquid crystal of the pixel at a time when light sources of the same color emit light is the same all the time. Therefore, burn-in and a decrease in reproducibility of colors of the liquid crystal can be suppressed. In addition, when a video signal for a same image is input to the pixel, the brightness of the color displayed in the pixel changes due to a change in the electric potential difference generated between before and after the change in the application direction of the voltage for driving the liquid crystal. However, in such a case, by repeatedly changing the application direction of the voltage for driving the liquid crystal, the brightness can be averaged.

In the above-described liquid crystal display device, it is preferable that the even light sources include a first light source that emits light of a first color and a second light source that emits light of a second color different from the first color, and the application direction of the voltage applied to the liquid crystal is changed for each one vertical scanning period, and the first light source and the second light source alternately emit light for each even vertical scanning periods. Under such a configuration, the application direction of the voltage is changed for each one vertical scanning period, and either one between the first light source and the second light source of a same color emits light for the even vertical scanning periods in which one vertical scanning period is repeated. Accordingly, voltages having different application directions are applied while either one between the first light source and the second light source of the same color emits light. As a result, it can be prevented that the application direction of the voltage applied to the liquid crystal of the pixel at a time when either one between the first light source and the second light source of a same color sequentially emits light is the same all the time. Therefore, burn-in and a decrease in reproducibility of colors of the liquid crystal can be suppressed.

In the above-described liquid crystal display device, it is preferable that the one vertical scanning period is set to be the same as $1/(60 \cdot m \cdot n)$ (second) where the number of the vertical scanning periods in which the same light source among the even light sources individually emits light is denoted by m and the number of the even light sources is denoted by n. In such a configuration, the vertical scanning period in which the even light sources emit light is the same as one vertical scanning period of a general driving process. Accordingly, flickering of a displayed image can be suppressed even in a case where the light sources emitting light are changed for each of even vertical scanning periods.

In the above-described liquid crystal display device, it is preferable that the voltage applied to the common electrode is a constant voltage, and the light sources emitting light are changed for each of even vertical scanning periods while the voltage applied to the pixel electrode is shifted between a high electric potential and a low electric potential with respect to the voltage applied to the common electrode for each one vertical scanning period. Under such a configuration, the light sources for emitting light can be changed for each even vertical scanning periods while DCCOM driving in which the voltage applied to the common electrode is constant and the voltage applied to the pixel electrode is shifted between the high electric potential and the low electric potential is performed. Accordingly, by employing the above-described configuration, burn-in and a decrease in reproducibility of colors of the liquid crystal can be suppressed in DCCOM driving.

In the above-described liquid crystal display device, it is preferable that the light sources emitting light are changed for each of even vertical scanning periods while the voltage applied to the common electrode is shifted between a high electric potential and a low electric potential for each one vertical scanning period. Under such a configuration, the light sources for emitting light can be changed for each of even vertical scanning periods while ACCOM driving in which the voltage applied between the common electrode and the pixel electrode is shifted between the high electric potential and the low electric potential is performed. Therefore, by employing the above-described configuration, burn-in and a decrease in reproducibility of colors of the liquid crystal in ACCOM driving can be suppressed.

In the above-described liquid crystal display device, it is preferable that the light sources emitting light are changed for each of even vertical scanning periods while the application direction of the voltage applied to the liquid crystal is changed for each horizontal line of the plurality of the pixels that is disposed in the matrix shape. Under such a configuration, the light sources for emitting light can be changed for each even vertical scanning period while line-inversion driving in which the voltage applied to the liquid crystal is changed for each horizontal line is performed. Accordingly, by using the above-described configuration, burn-in and a decrease in reproducibility of colors of the liquid crystal in line-inversion driving can be suppressed.

In the above-described liquid crystal display device, it is preferable that colors of light emitted by the first light source and the second light source are different colors selected from among red, green, and blue colors. Under such a configuration, a color image can be displayed in an easy manner by additive color mixing.

According to a fourth aspect of the inventions there is provided a head-up display including the above-described liquid crystal device. Under the above-described configuration, a head-up display capable of suppressing burn-in and a decrease in reproducibility of colors of the liquid crystal can be acquired.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the accompanying drawings.

First Embodiment

Figure 1:
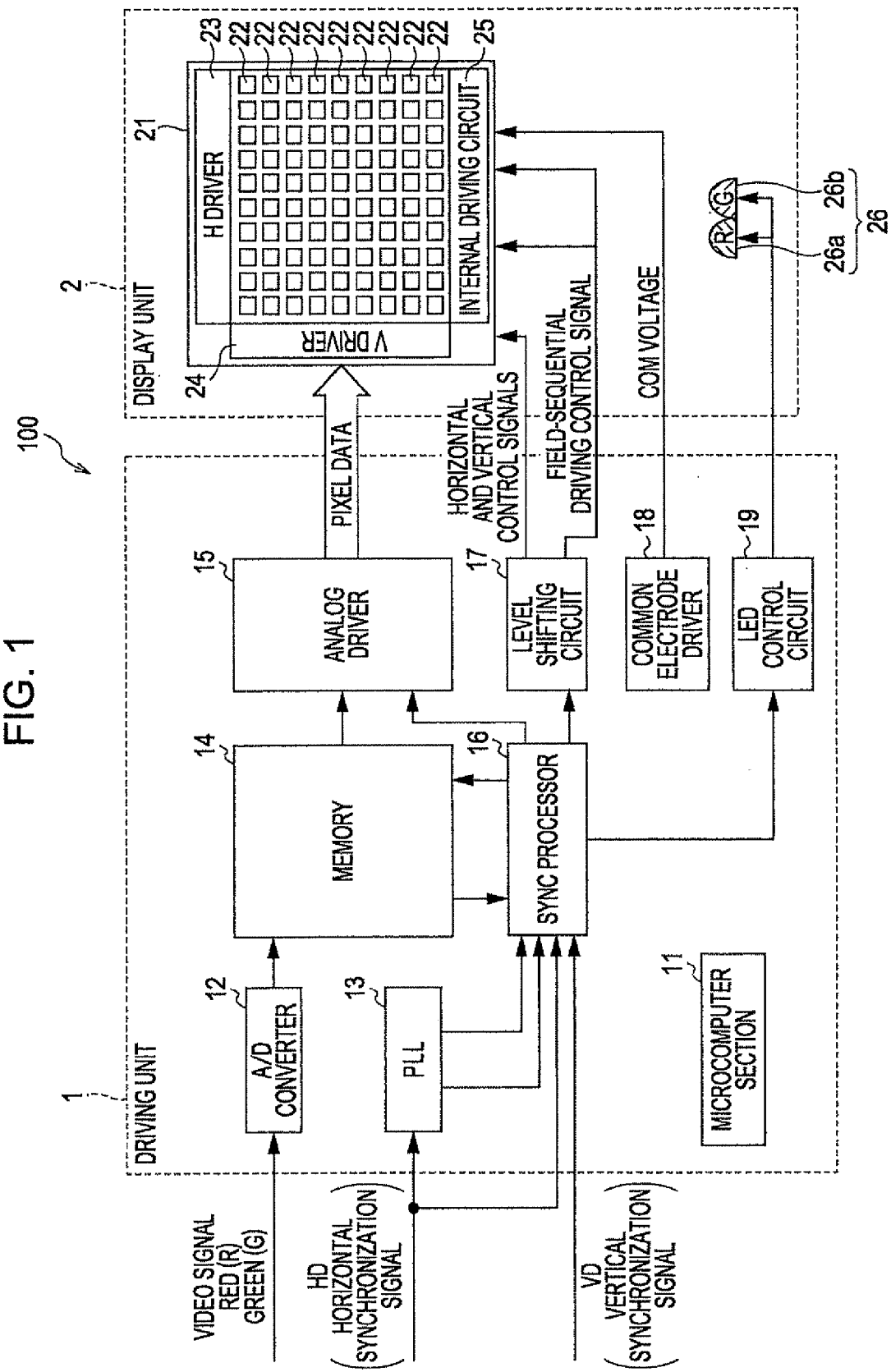
FIG. 1 is a block diagram showing the whole configuration of a field-sequential liquid crystal display device according to a first embodiment of the invention.
Figure 2:
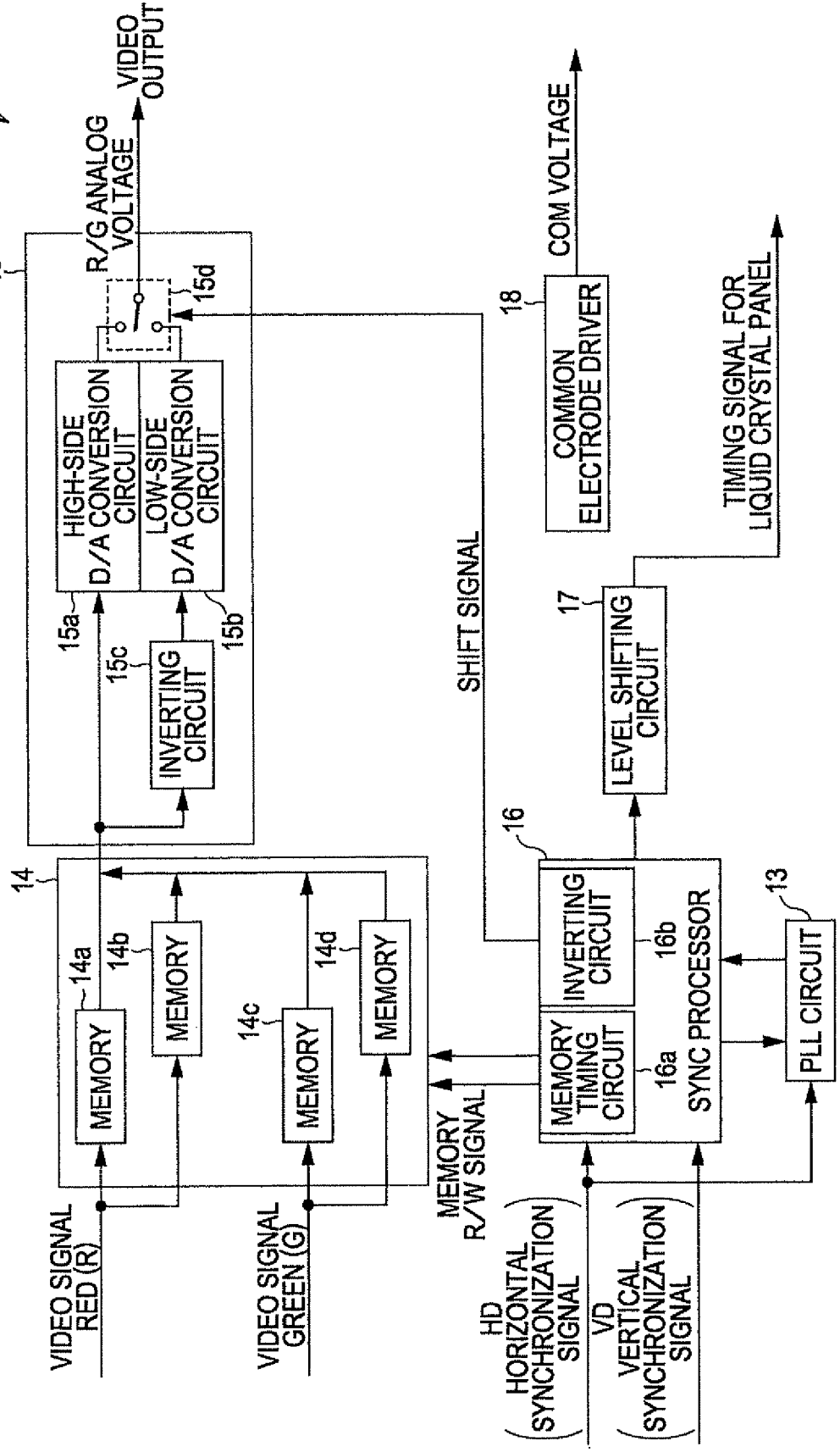
FIG. 2 is a diagram showing a detailed configuration of a liquid crystal display device according to the first embodiment of the invention.
Figure 3:
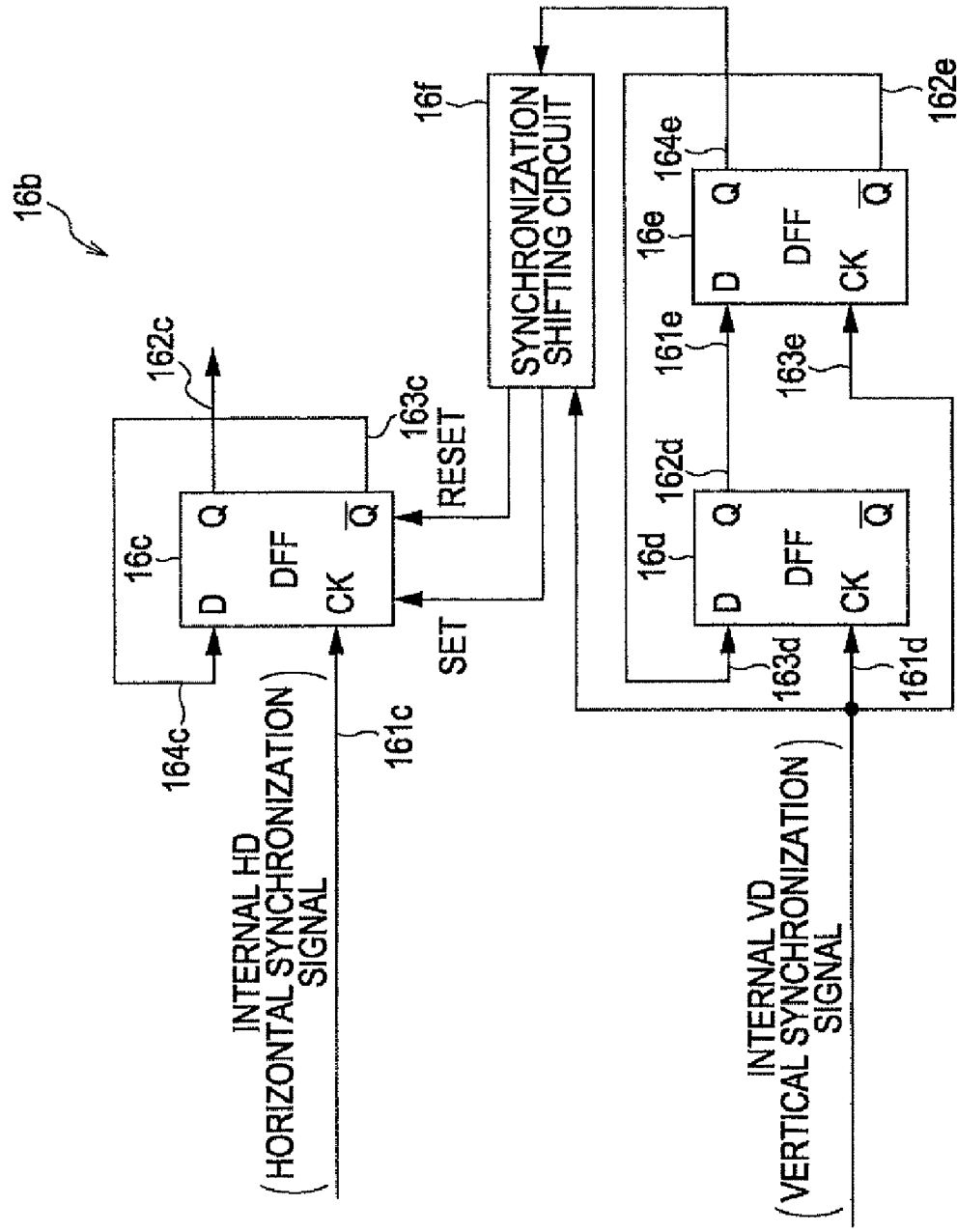
FIG. 3 is a diagram showing a detailed configuration of a liquid crystal display device according to the first embodiment of the invention.
Figure 4:
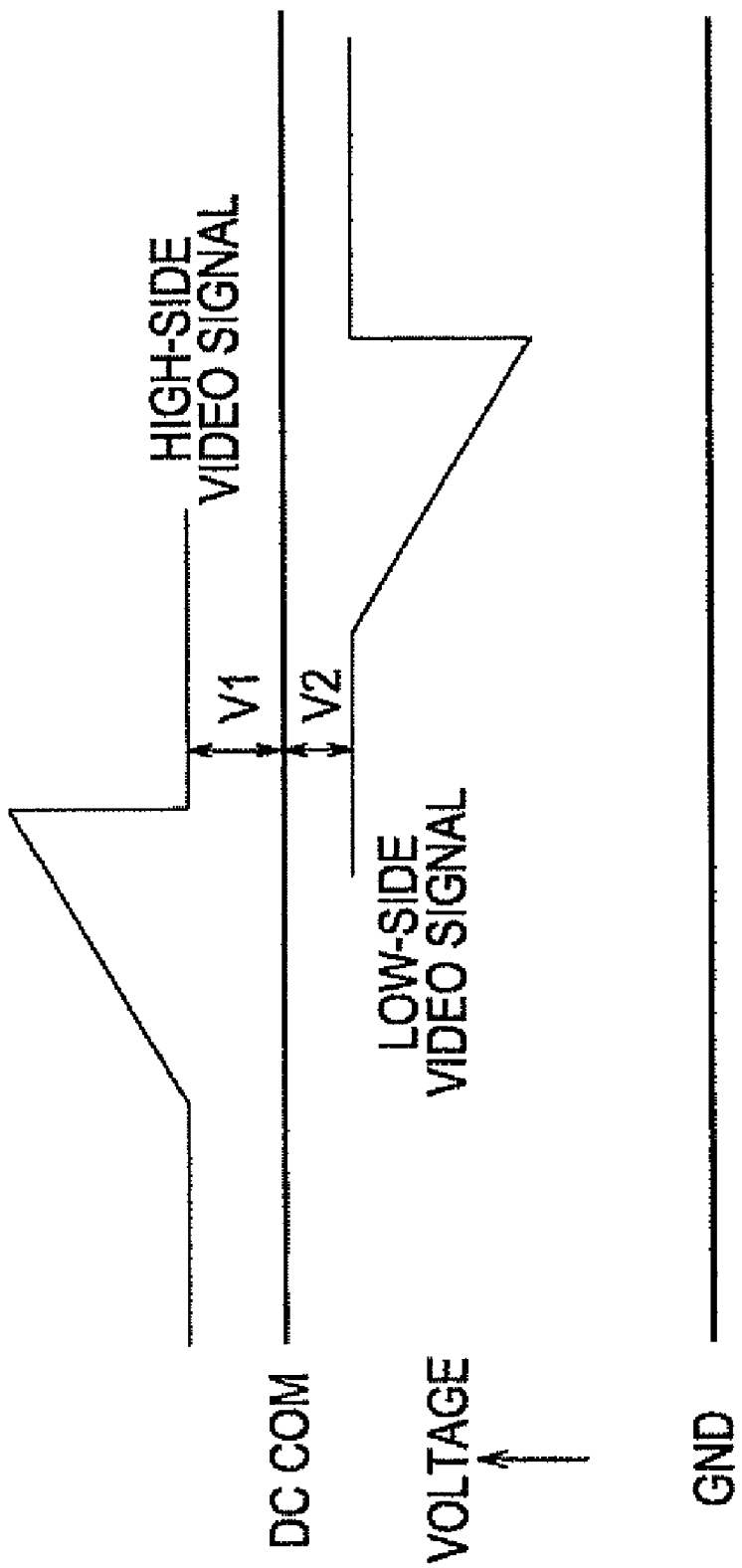
FIG. 4 is a diagram for explaining a video output signal of a liquid crystal display device according to the first embodiment of the invention.
Figure 5:
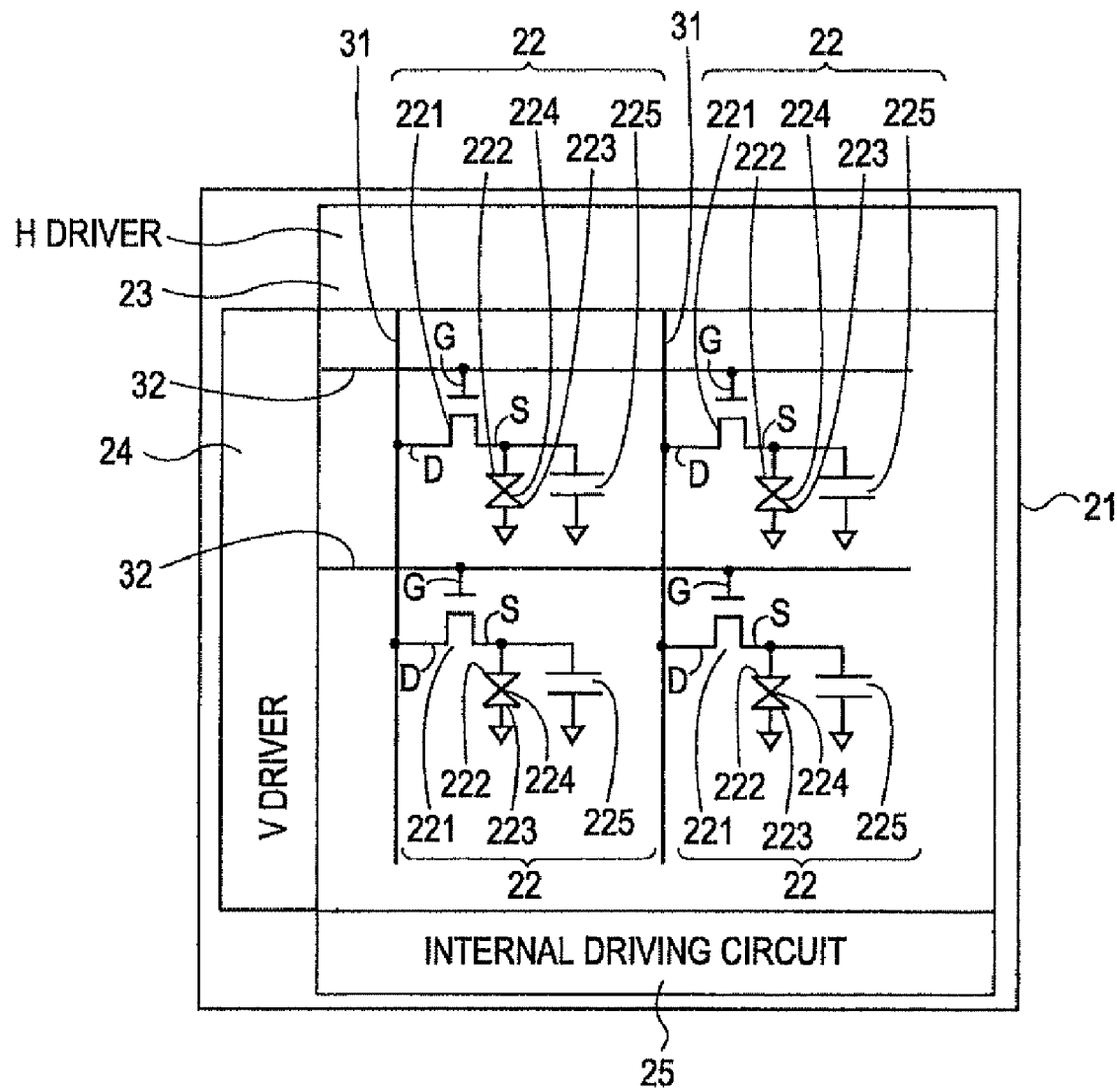
FIG. 5 is a diagram showing the configuration of a pixel according to the first embodiment of the invention.

FIG. 1 is a block diagram showing the whole configuration of a field-sequential liquid crystal display device according to a first embodiment of the invention. FIGS. 2 and 3 are diagrams showing detailed configurations of a liquid crystal display device according to the first embodiment of the invention. FIG. 4 is a diagram for explaining a video output signal of a liquid crystal display device according to the first embodiment of the invention. FIG. 5 is a diagram showing the configuration of a pixel according to the first embodiment of the invention. First, the structure of the field-sequential liquid crystal display device 100 according to this embodiment will be described with reference to FIGS. 1 to 5. In the first embodiment, a case where the present invention is applied to the field-sequential liquid crystal display device 100 as an example of the liquid crystal display device will be described.

The field-sequential liquid crystal display device 100 according to the first embodiment, as shown in FIG. 1, is configured by a driving unit 1 and a display unit 2. Hereinafter, the configuration of the field-sequential liquid crystal display device 100 will be described in detail.

As shown in FIG. 1, the driving unit 1 is configured by a microcomputer section 11, an A/D converter 12, a PLL (phase synchronization) circuit 13, a memory 14, an analog driver 15, a SYNC processor 16, a level shifting circuit 17, a common electrode driver 18, and an LED control circuit 19.

The microcomputer section 11 is connected to all the circuits that are included in the driving unit 1 and has a function for controlling the overall operation of the driving unit 1. The A/D converter 12 is connected to the memory 14. This A/D converter 12 has a function for converting an analog VIDEO signal (video signal) into a digital signal. The memory 14 has a function for storing a digital signal of RG. This memory 14, as shown in FIG. 2, is configured by a memory 14a, a memory 14b, a memory 14c, and a memory 14d. In addition, the memory 14a is connected to the memory 14b in parallel to each other. In addition, the memory 14c is connected to the memory 14d in parallel to each other. In addition, the memories 14a and 14b are configured to receive a digital VIDEO signal of R (red) as an input. In addition, the memories 14c and 14d are configured to receive a digital VIDEO signal of G (green) as an input.

The PLL circuit 13 is connected to the SYNC processor 16. The PLL circuit 13 has a function for generating a clock that is needed for a field-sequential driving operation. The SYNC processor 16 has a function for generating a signal that is used for driving a pixel 22 to be described later. This SYNC processor 16, as shown in FIG. 2, is configured by a memory timing circuit 16a and an inverting circuit 16b. This inverting circuit 16b has a function for shifting the application direction of a voltage, which is used for driving a liquid crystal 224 to be described later, between the positive (+) side and the negative (−) side. In addition, the inverting circuit 16b uses a period (two vertical scanning periods) for sequential emission of LEDs 26a and 26b, which will be described later, as one unit period and has a function for shifting the application direction of the voltage, which is used for driving the liquid crystal 224, between the positive (+) side and the negative (−) side for each unit period (two vertical scanning periods). The memory timing circuit 16a has a function for generating a timing signal for storing the VIDEO signals that are converted into digital signals of RG into the memory 14 for each RG and a timing signal for a call that is needed for the field-sequential driving operation.

In addition, the inverting circuit 16b, as shown in FIG. 3, is configured by a DFF circuit (D flipflop circuit) 16c, a DFF circuit 16d, a DFF circuit 16e, and a synchronization shifting circuit 16f. The DFF circuit 16c is connected to the synchronization shifting circuit 16f. This DFF circuit 16c is configured such that an internal HD signal (horizontal synchronization signal) is input to an input section 161c. In addition, the DFF circuit 16c is configured to receive a RESET signal or a SET signal as an input from the synchronization shifting circuit 16f. An output section 162c is configured to output a shift signal to the analog driver 15. In addition, an output section 163c is configured to output an inverted signal of the signal output from the output section 162c. An input section 164c is configured to receive the inverted signal as an input.

In addition, the DFF circuit 16d is configured such that an internal VD signal (vertical synchronization signal) is input to an input section 161d. An output section 162d is connected to an input section 161e of the DIF circuit 16e. In addition, an input section 163d is connected to an output section 162e of the DFF circuit 16e.

In addition, the DFF circuit 16e is configured such that the internal VD signal (vertical synchronization signal) is input to an input section 163e. An output section 164e is connected to the synchronization shifting circuit 16f. In addition, the synchronization shifting circuit 16f is configured to receive the internal VD signal (vertical synchronization signal) as an input. It is configured that two vertical scanning periods (vertical synchronization signals) are counted by the DFF circuits 16d and 16e.

In addition, as shown in FIG. 1, the memory 14 is connected to the analog driver 15. The analog driver 15 has a function for converting the digital signal of RG into an analog signal of RG and supplying the analog signal of RG to the display unit 2. This analog driver 15, as shown in FIG. 2, is configured by a D/A conversion circuit 15a, a D/A conversion circuit 15b, an inverting circuit 15c, and a shift switch 15d. In addition, the D/A conversion circuit 15a is connected to the shift switch 15d. This D/A conversion circuit 15a has a function for converting the input digital signal into an analog signal and outputting the analog signal as a High-side signal of the VIDEO signal. In addition, the inverting circuit 15c is connected to the D/A conversion circuit 15b. This inverting circuit 15c has a function for inverting the input digital signal and outputting the inverted signal. In addition, the D/A conversion circuit 15b is connected to the shift switch 15d. This D/A conversion circuit 15b has a function for converting the input digital signal into an analog signal and outputting the analog signal as a Low-side signal. In addition, the shift switch 15d is configured to change connection of the D/A conversion circuits 15a and 15b based on the shift signal that is output from the inverting circuit 16b of the SYNC processor 16.

In addition, as shown in FIG. 4, pixel data (VIDEO signal) is configured to be output in accordance with shift of the shift switch 15d. In particular, according to the first embodiment, the voltage that is applied to a common electrode 223 (see FIG. 5) to be described later is a constant voltage (DCCOM). In addition, the voltage (VIDEO signal) that is applied to a pixel electrode 222 (see FIG. 5) is configured to be switchable between a high electric potential and a low electric potential with respect to the voltage applied to a common electrode 223 for each two vertical scanning periods. This VIDEO signal is configured such that the high-side and low-side VIDEO signals that are positive (+) and negative (−) with respect to DCCOM are output. Alternatively, in the first embodiment, the voltage applied to the common electrode 223 may be a voltage (ACCOM) that is shifted between a high electric potential and a low electric potential for each two vertical scanning periods.

In addition, as shown in FIG. 1, the SYNC processor 16 is connected to the memory 14, the analog driver 15, the level shifting circuit 17, and the LED control circuit 19. The level shifting circuit 17 has a function for generating pulses (a horizontal or vertical control signal and a field-sequential driving control signal) that are used for driving the pixel 22. In addition, the LED control circuit 19 has a function for controlling emission and stop of emission for an LED 26 to be described later in accordance with the timing of the field-sequential driving operation. In addition, the common electrode driver 18 has a function for determining a voltage to be applied to the common electrode 223 to be described later and supplying the voltage to the pixel 22.

In addition, the display unit 2, as shown in FIG. 1, is configured by a substrate 21, a plurality of pixels 22, an H driver 23, and a V driver 24 that are connected to the plurality of pixels 22, an internal driving circuit 25 that drives an H driver 23, a V driver 24, and LEDs 26 (26a and 26b) that emit red light (R) and green light (G) as back light (light source) of the pixels 22. The LED 26 is an example of the "light source" according to an embodiment of the invention. In addition, the LED 26a that emits red light (R) is an example of the "first light source" according to an embodiment of the invention, and the LED 26b that emits green light (G) is an example of the "second light source" according to an embodiment of the invention.

As shown in FIG. 5, on the substrate 21, a plurality of signal lines 31 and a plurality of scanning lines 32 are disposed to be perpendicular to each other. The signal lines 31 are connected to the H driver 23, and the scanning lines 32 are connected to the V driver 24. In a position in which the signal line 31 and the scanning line 32 intersect each other, the pixel 22 is disposed. In FIG. 5, for the simplification of the drawing, a configuration of only four pixels is shown. Each pixel 22 is configured by an n-channel transistor 221, a pixel electrode 222, a common electrode 223 that is disposed to face the pixel electrode 222, a liquid crystal 224 that is interposed between the pixel electrode 222 and the common electrode 223, and an auxiliary capacitor 225. The drain region D of the n-channel transistor 221 is connected to the signal line 31, and the source region S of the n-channel transistor 221 is connected to one electrode between the pixel electrode 222 and the auxiliary capacitor 225. In addition, the gate G of the n-channel transistor 221 is connected to the scanning line 32.

Figure 6:
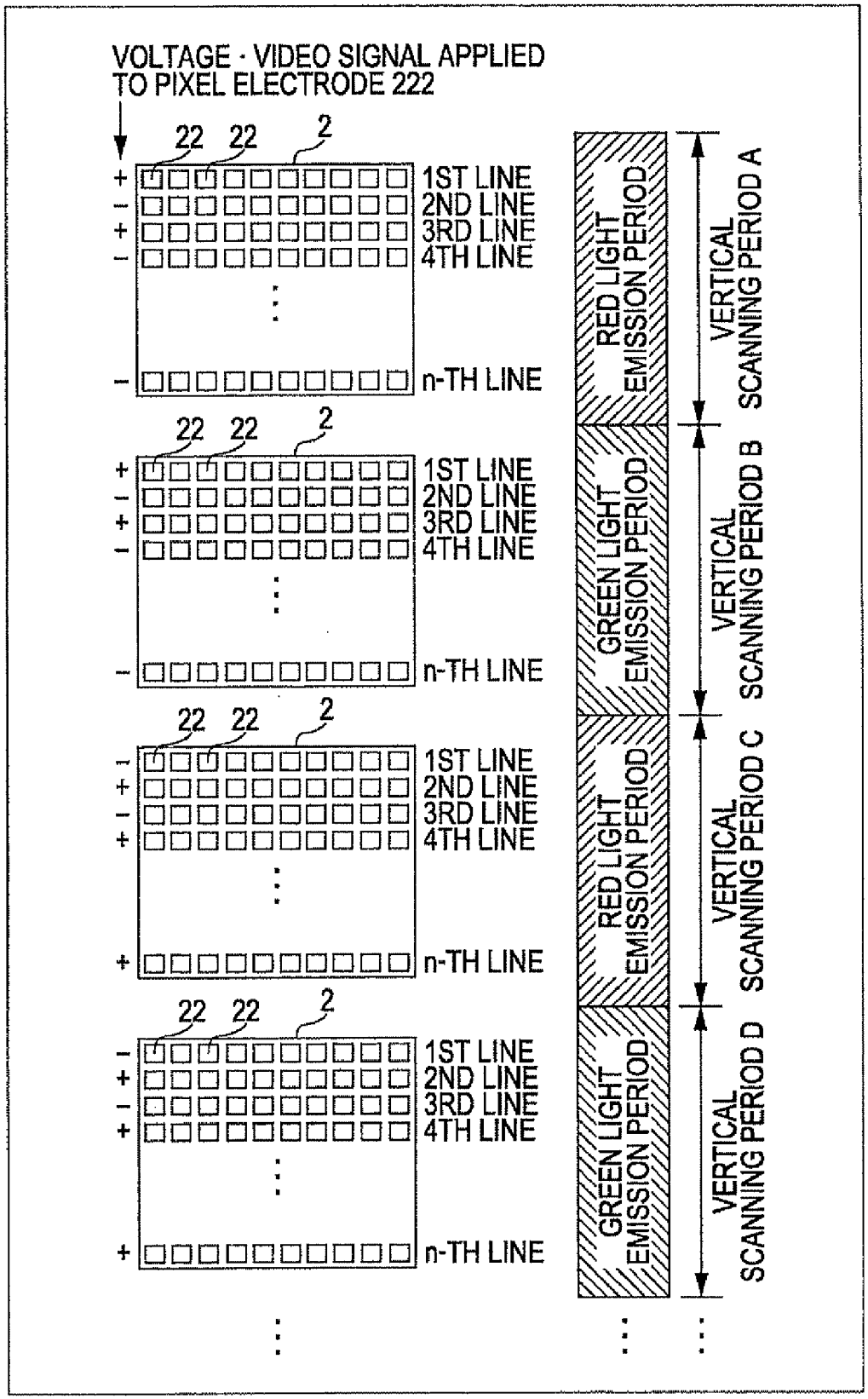
FIG. 6 is a diagram showing the operation of a field-sequential liquid crystal display device according to the first embodiment of the invention.
Figure 7:
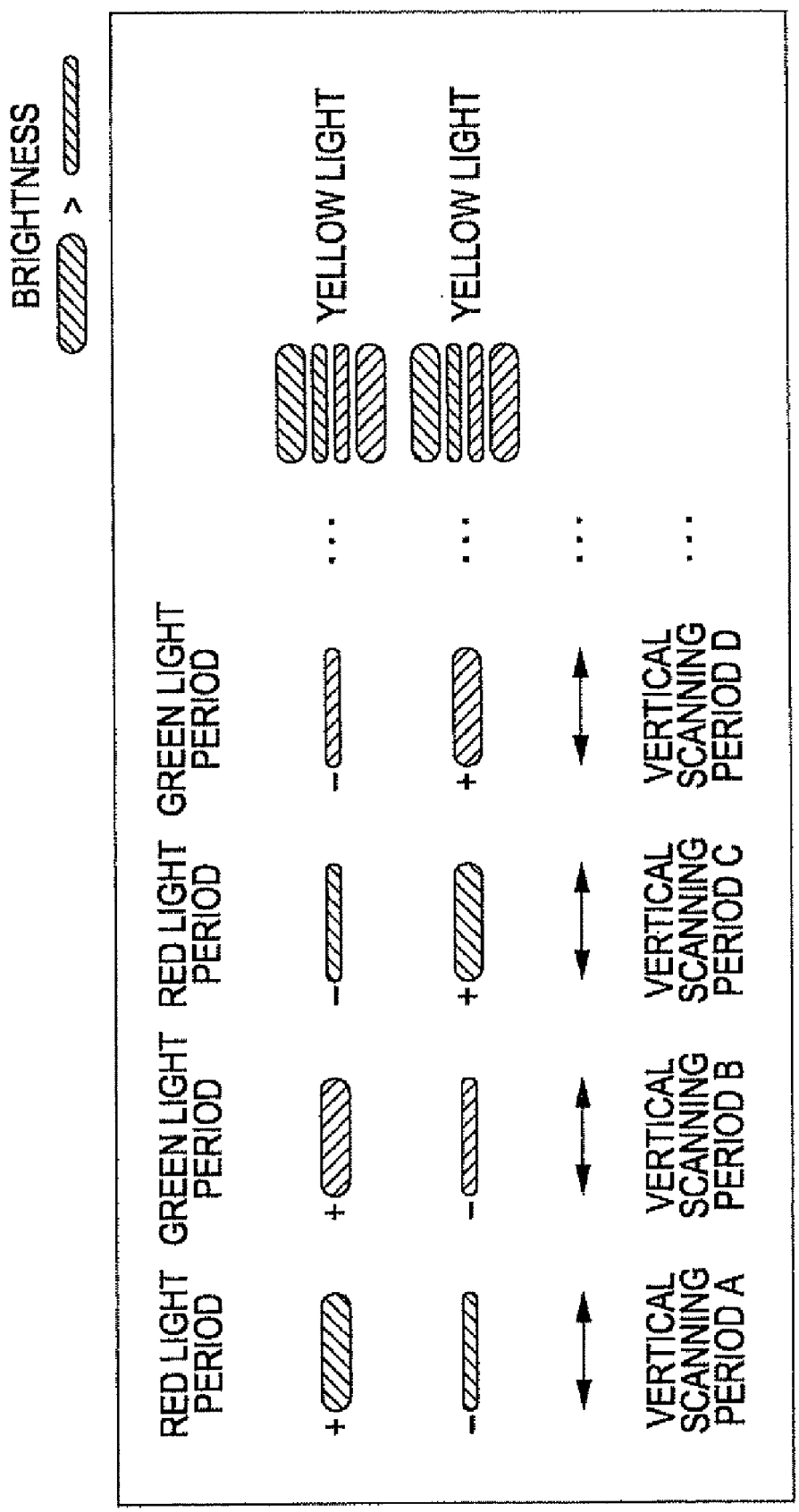
FIG. 7 is a diagram showing the operation of a field-sequential liquid crystal display device according to the first embodiment of the invention.

FIGS. 6 and 7 are diagrams showing the operation of a field-sequential liquid crystal display device according to the first embodiment. Next, the operation of the field-sequential liquid crystal display device 100 according to the first embodiment will be described with reference to FIGS. 1, 2, 6, and 7.

First, as shown in FIG. 1, an analog VIDEO signal is input to the A/D converter 12, and the analog VIDEO signal is converted into digital signals of RG. In addition, horizontal and vertical synchronization signals are input to the PLL circuit 13. Then, the digital signals of RG are stored in the memory 14 in accordance with timing signals, which are generated by the memory timing circuit 16a (see FIG. 2) of the SYNC processor 16, for storing each signal of the red color and the green color in the memory 14. In addition, the VD (vertical synchronization signal) is counted twice by the inverting circuit 16b (see FIG. 2) of the SYNC processor 16, and a shift signal is output to the analog driver 15. Accordingly, in the first embodiment, the application direction of the voltage that is used for driving the liquid crystal 224 can be shifted between the positive (+) side and the negative (−) side for each two vertical scanning periods.

In addition, timing signals for recording the image data of RG and emission of the LEDs 26 are generated by the SYNC processor 16. The horizontal and vertical control signals and the field-sequential driving control signal are supplied to the display unit 2 through the level shifting circuit 17 based on the timing signals that are generated by the SYNC processor 16. In addition, a voltage to be applied to the common electrode 223 (see FIG. 5) is determined by the common electrode driver 18 so as to be supplied to the display unit 2. The emission of the LEDs 26 is controlled in accordance with the field-sequential driving timing by the LED control circuit 19.

In addition, according to the first embodiment, as shown in FIG. 6, the application direction of the voltage that is applied to the liquid crystal 224 changes for each horizontal line of the plurality of the pixels 22 disposed in the matrix shape. In particular, voltages that shift between the high electric potential and the low electric potential with respect to the common electrode 223 are applied (VIDEO signal) to the pixel electrode 222 (see FIG. 4), and a line-inversion driving process is performed such that the voltage applied to the liquid crystal 224 is shifted between the positive (+) voltage and the negative (−) voltage for each horizontal line. In addition, to the common electrodes 223 of the pixels 22, a constant voltage is applied.

Next, the operation of the field sequential liquid crystal display device 100 for a case where an image is displayed in the display unit 2 will be described.

First, as shown in FIG. 6, the positive (+) voltage is applied to the pixel electrodes 222 of the pixels 22 in odd lines (the first line, the third line, etc.) among the pixels 22 disposed in the matrix shape, for the vertical scanning period A and the vertical scanning period B. In addition, the negative (−) voltage is applied to the pixel electrodes 222 of the pixels 22 in even lines (the second line, the fourth line, etc.) among the pixels 22 disposed in the matrix shape, for the vertical scanning period A and the vertical scanning period B. On the other hand, the negative (−) voltage is applied to the pixel electrodes 222 of the pixels 22 in odd lines (the first line, the third line, etc.) among the pixels 22 disposed in the matrix shape, for the vertical scanning period C and the vertical scanning period D. In addition, the positive (+) voltage is applied to the pixel electrodes 222 of the pixels 22 in even lines (the second line, the fourth line, etc.) among the pixels 22 disposed in the matrix shape, for the vertical scanning period C and the vertical scanning period D.

As shown in FIG. 4, when a video signal for a same image is input to the pixel 22, the electric potential difference between a voltage (VIDEO signal) applied to the pixel electrode and a voltage (DCCOM) applied to the common electrode 223 are configured to be different between before and after the application direction of the voltage for driving the liquid crystal 224 changes. In particular, the electric potential difference V1 between DCCOM and the High-side VIDEO signal and an electric potential difference V2 between DCCOM and the Low-side VIDEO signal are different from each other. In addition, the electric potential differences V1 and V2 change in accordance with the change of the VIDEO signal or DCCOM. Accordingly, even when the video signal for a same image is input to the pixel 22, the brightness of the color displayed in the pixel 22 changes between before and after the application direction of the voltage for driving the liquid crystal 224 changes.

In FIG. 7, the brightness of the red light and the green light displayed in the display unit 2 is denoted by thicknesses of lines. Thus, a thick line represents emission of light that is brighter than that of a thin line. The emission of the red light and the green light displayed in the display unit 2 represents the red light in the pixels 22 of the display unit 2 for the vertical scanning period A (red light emission period). However, the red light represented in the pixels 22 of odd lines (the first line, the third line, etc.) is bright (the electric potential difference V1 represented in FIG. 4), and the red light represented in the pixels 22 of even lines (the second line, the fourth line, etc.) is dark (the electric potential difference V2 represented in FIG. 4).

Next, for the vertical scanning period B (green light emission period), same as light emission for the vertical scanning period A (red light emission period), green light is displayed in the pixels 22 of the display unit 2. However, the green light displayed in the pixels 22 of odd lines (the first line, the third line, etc.) is bright, and the green light displayed in the pixels 22 of even lines (the second line, the fourth line, etc.) is dark.

Then, for the vertical scanning period C (red light emission period), differently from light emission for the vertical scanning period A (red light emission period) and the vertical scanning period B (green light emission period), the red light displayed in the pixels 22 in odd lines (the first line, the third line, etc.) is dark, and the red light displayed in the pixels 22 in even lines (the second line, the fourth line, etc.) is bright.

Next, for the vertical scanning period D (green light emission period), as light emission for the vertical scanning period C (red light emission period), the green light displayed in the pixels 22 in odd lines (the first line, the third line, etc.) is dark, and the green light displayed in the pixels 22 in even lines (the second line, the fourth line, etc.) is bright. Thereafter, light emission for the vertical scanning period E (not shown) is the same as that for the vertical scanning period A.

According to the first embodiment, as described above, by configuring the application direction of the voltage for driving the liquid crystal 224 to be changed for each unit period that is a period for sequential light emission of the red LED 26a and the green LED 26b once, the application direction of the voltage for driving the liquid crystal 224 is changed after sequential light emission of the red LED 26a and the green LED 26b. Accordingly, when light emission of the red LED 26a and the green LED 26b is performed next, the application direction of the voltage applied to the liquid crystal 224 of the pixels 22 changes assuredly. As a result, it can be prevented that the application direction of the voltage applied to the liquid crystal 224 is the same all the time, and thereby burn-in and a decrease in reproducibility of colors of the liquid crystal 224 can be suppressed.

In addition, according to the first embodiment, as described above, it is configured that the voltage applied to the common electrode 223 is a constant voltage and the voltage applied to the pixel electrode 222 is changed between the high electric potential and the low electric potential with respect to the voltage applied to the common electrode 223 for each two vertical scanning periods. Accordingly, DCCOM driving in which the voltage applied to the common electrode 223 is constant and the voltage applied to the pixel electrode 222 is changed between the high electric potential and the low electric potential with respect to the voltage applied to the common electrode 223 can be performed. Therefore, by using the configuration according to the first embodiment, burn-in and a decrease in reproducibility of colors of the liquid crystal 224 in DCCOM driving can be suppressed.

In addition, according to the first embodiment, as described above, by configuring the voltage applied to the common electrode 223 to be shifted between the high electric potential and the low electric potential for each two vertical scanning periods, ACCOM driving in which the voltage applied to the common electrode 223 is shifted between the high electric potential and the low electric potential can be performed. Therefore, by using the configuration according to the first embodiment, burn-in and a decrease in reproducibility of colors of the liquid crystal 224 in ACCOM driving can be suppressed.

In addition, according to the first embodiment, as described above, by configuring the application direction of the voltage applied to the liquid crystal 224 to be changed for each horizontal line of the plurality of pixels 22 disposed in the matrix shape, line-inversion driving in which the voltage applied to the liquid crystal 224 is changed for each horizontal line can be performed. Accordingly, by using the configuration according to the first embodiment, burn-in and a decrease in reproducibility of colors of the liquid crystal 224 in line-inversion driving can be suppressed.

In addition, according to the first embodiment, as described above, by setting the colors of light emission of the LEDs 26 (26a and 26b) to be different colors selected from among red, green, and blue colors, a color image can be displayed in an easy manner by using additive color mixing.

Second Embodiment

Figure 8:
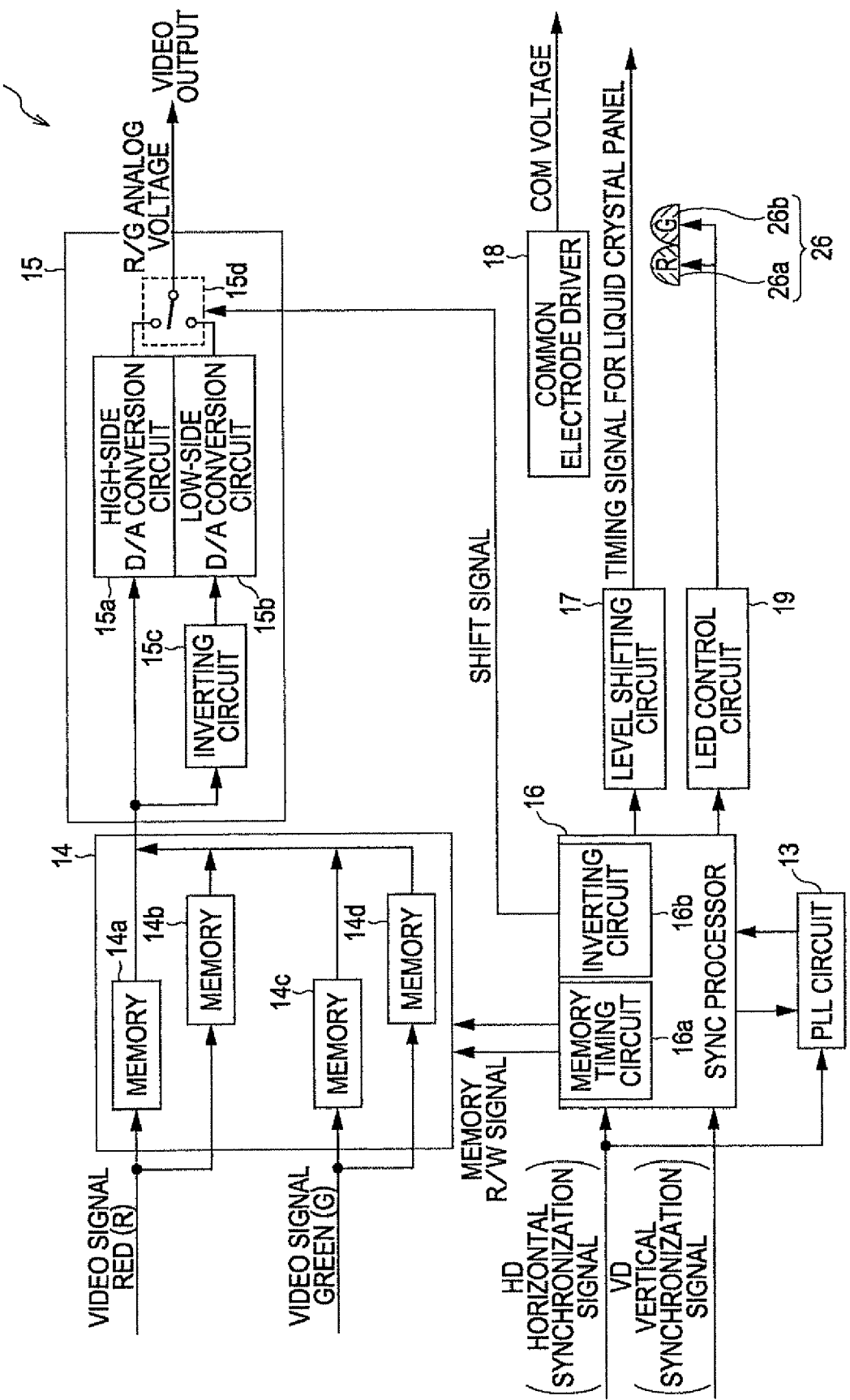
FIG. 8 is a diagram showing a detailed configuration of a liquid crystal display device according to a second embodiment of the invention.
Figure 9:
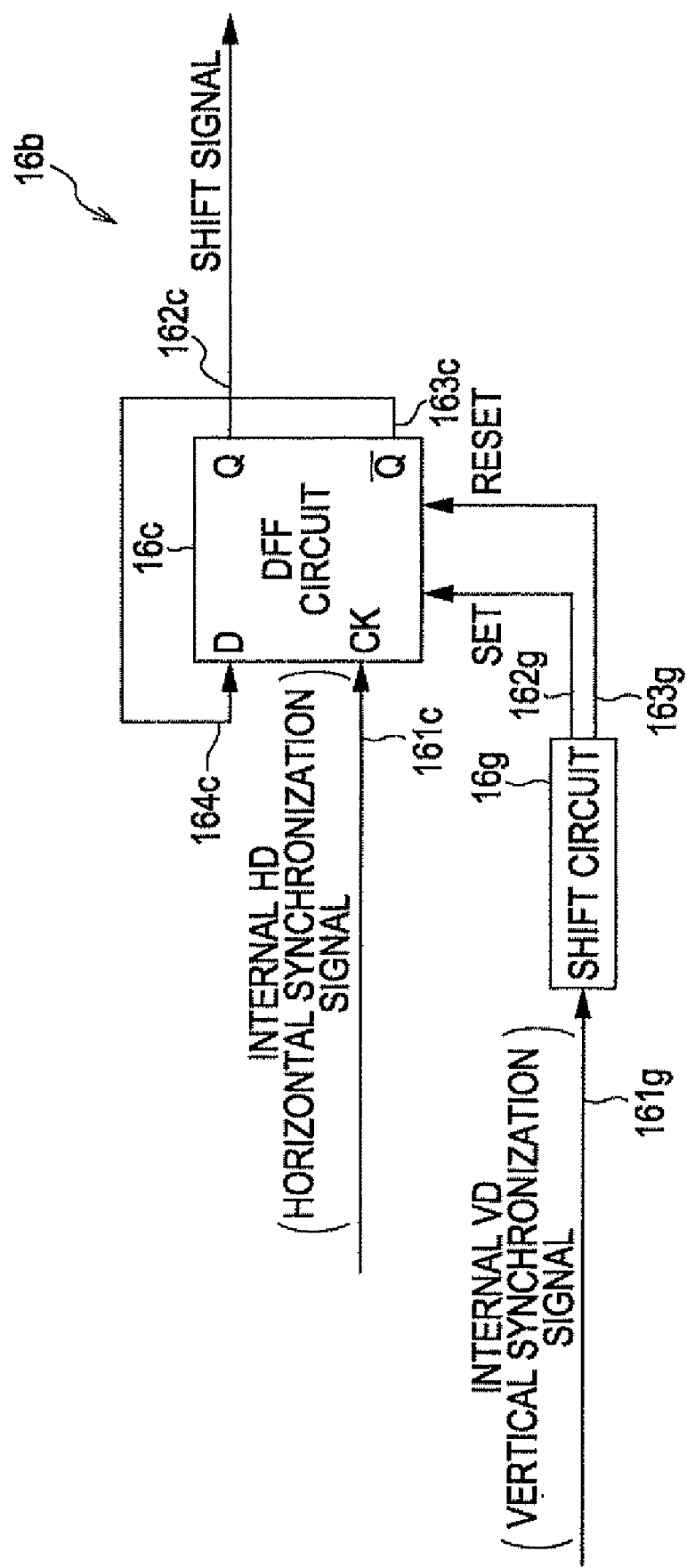
FIG. 9 is a diagram showing a detailed configuration of a liquid crystal display device according to the second embodiment of the invention.

FIG. 1 is a block diagram showing the whole configuration of a field-sequential liquid crystal display device according to a second embodiment of the invention, same as the first embodiment of the invention. FIGS. 8 and 9 are diagrams showing detailed configurations of a liquid crystal display device according to the second embodiment of the invention. FIG. 4 is a diagram for explaining a video output signal of a liquid crystal display device according to the second embodiment of the invention, same as the first embodiment of the invention. FIG. 5 is a diagram showing the configuration of a pixel according to the second embodiment of the invention, same as the first embodiment of the invention. First, the structure of the field-sequential liquid crystal display device 100 according to the second embodiment will be described with reference to FIGS. 1, 4, 5, 8, and 9. In the second embodiment, a case where the present invention is applied to the field-sequential liquid crystal display device 100 as an example of the liquid crystal display device will be described.

The field-sequential liquid crystal display device 100 according to the second embodiment, as shown in FIG. 1, is configured by a driving unit 1 and a display unit 2. Hereinafter, the configuration of the field-sequential liquid crystal display device 100 will be described in detail.

As shown in FIG. 1, the driving unit 1 is configured by a microcomputer section 11, an A/D converter 12, a PLL (phase synchronization) circuit 13, a memory 14, an analog driver 15, a SYNC processor 16, a level shifting circuit 17, a common electrode driver 18, and an LED control circuit 19.

The microcomputer section 11 is connected to all the circuits that are included in the driving unit 1 and has a function for controlling the overall operation of the driving unit 1. The A/D converter 12 is connected to the memory 14. This A/D converter 12 has a function for converting an analog VIDEO signal (video signal) into a digital signal. The memory 14 has a function for storing a digital signal of RG. This memory 14, as shown in FIG. 8, is configured by a memory 14a, a memory 14b, a memory 14c, and a memory 14d. In addition, the memories 14a and 14b are configured to receive a digital VIDEO signal of R (red) as an input. In addition, the memories 14c and 14d are configured to receive a digital VIDEO signal of G (green) as an input.

The PLL circuit 13 is connected to the SYNC processor 16. The PLL circuit 13 has a function for generating a clock that is needed for a field-sequential driving operation. The SYNC processor 16 has a function for generating a signal that is used for driving a pixel 22 to be described later. This SYNC processor 16, as shown in FIG. 8, is configured by a memory timing circuit 16a and an inverting circuit 16b. The memory timing circuit 16a has a function for generating a timing signal for storing the VIDEO signals that are converted into digital signals of RG into the memory 14 for each RG and a timing signal for a call that is needed for the field-sequential driving operation.

In addition, the inverting circuit 16b, as shown in FIG. 9, is configured by a DFF circuit (D flipflop circuit) 16c and a shift circuit 16g. The DFF circuit 16c is connected to the shift circuit 16g. This DFF circuit 16c is configured such that an internal HD signal (horizontal synchronization signal) is input to an input section 161c. In addition, the DFF circuit 16c is configured to receive a RESET signal or a SET signal as an input from the shift circuit 16g. An output section 162c is configured to output a shift signal to the analog driver 15 (see FIG. 1). In addition, an output section 163c is configured to output an inverted signal of the signal output from the output section 162c. An input section 164c is configured to receive the inverted signal as an input.

In addition, the shift circuit 16g is configured such that an internal VD signal (vertical synchronization signal) is input to an input section 161g. An output section 162g is configured such that a SET signal is output to the DFF circuit 16c. In addition, an output section 163g is configured such that a RESET signal is output to the DFF circuit 16c.

In addition, as shown in FIG. 1, the memory 14 is connected to the analog driver 15. The analog driver 15 has a function for converting the digital signal of RG into an analog signal of RG and supplying the analog signal of RG to the display unit 2. This analog driver 15, as shown in FIG. 8, is configured by a D/A conversion circuit 15a, a D/A conversion circuit 15b, an inverting circuit 15c, and a shift switch 15d. In addition, the D/A conversion circuit 15a is connected to the shift switch 15d. This D/A conversion circuit 15a has a function for converting the input digital signal into an analog signal and outputting the analog signal as a High-side signal of the VIDEO signal. In addition, the inverting circuit 15c is connected to the D/A conversion circuit 15b. This inverting circuit 15c has a function for inverting the input digital signal and outputting the inverted signal. In addition, the D/A conversion circuit 15b is connected to the shift switch 15d. This D/A conversion circuit 15b has a function for converting the input digital signal into an analog signal and outputting the analog signal as a Low-side signal. In addition, the shift switch 15d is configured to change connection of the D/A conversion circuits 15a and 15b based on the shift signal that is output from the inverting circuit 16b of the SYNC processor 16.

In addition, as shown in FIG. 4, pixel data (VIDEO signal) is configured to be output in accordance with shift of the shift switch 15d. In particular, according to the first embodiment, the voltage that is applied to a common electrode 223 (see FIG. 5) to be described later is a constant voltage (DCCON). In addition, the voltage (VIDEO signal) that is applied to a pixel electrode 222 (see FIG. 5) is a voltage that is shifted between a high electric potential and a low electric potential with respect to the voltage applied to a common electrode 223 for each one vertical scanning period. In addition, the application direction of the voltage applied to the pixel electrode 222 is configured to be changed by the shift switch 15d for each one vertical scanning period based on the shift signal that is output from the inverting circuit 16b of the SYNC processor 16. Between LEDs 26 (26a and 26b) to be described later, the LED 26 (the LED 26a or 26b) emitting light is configured to be changed for each two vertical scanning periods. This VIDEO signal is configured such that the high-side and low-side VIDEO signals are output for applying the positive (+) and the negative (−) voltages to a liquid crystal 224 to be described later. Alternatively, in the second embodiment, the voltage applied to the common electrode 223 may be a voltage (ACCOM) that is shifted between a high electric potential and a low electric potential for each one vertical scanning period and changes the LEDs 26 (LED 26a and LED 26b) emitting light for each two vertical periods.

In addition, as shown in FIG. 1, the SYNC processor 16 is connected to the memory 14, the analog driver 15, the level shifting circuit 17, and the LED control circuit 19. The level shifting circuit 17 has a function for generating pulses (a horizontal or vertical control signal and a field-sequential driving control signal) that are used for driving the pixel 22. In addition, the LED control circuit 19 has a function for controlling emission and stop of emission for the LEDs 26 in accordance with the timing of the field-sequential driving operation. This LED control circuit 19 is configured to control the LEDs 26 such that the LED 26 (the LED 26a or 26b) emitting light is changed for each two vertical scanning periods. Simultaneously with the control operation, the application direction of the voltage applied to a liquid crystal 224 to be described later is shifted between the positive (+) side and the negative (−) side for each one vertical scanning period. In addition, the common electrode driver 18 has a function for determining a voltage to be applied to the common electrode 223 to be described later and supplying the voltage to the pixel 22.

In addition, the display unit 2, as shown in FIG. 1, is configured by a substrate 21, a plurality of pixels 22, an H driver 23, and a V driver 24 that are connected to the plurality of pixels 22, an internal driving circuit 25 that drives an H driver 23, a V driver 24, and LEDs 26 (LEDs 26a and 26b) that emit red light (R) and green light (G) as back light (light source) of the pixels 22. The LED 26 is an example of the "light source" according to an embodiment of the invention. In addition, according to the second embodiment, the LED 26a that emits red light (R) is an example of the "first light source" according to an embodiment of the invention, and the LED 26b that emits green light (G) is an example of the "second light source" according to an embodiment of the invention.

According to the second embodiment, a plurality of the pixels 22 is configured to be driven in accordance with sequential light emission of the LEDs 26 (LEDs 26a and 26b). As shown in FIG. 5, on the substrate 21, a plurality of signal lines 31 and a plurality of scanning lines 32 are disposed to be perpendicular to each other. The signal lines 31 are connected to the H driver 23, and the scanning lines 32 are connected to the V driver 24, in a position in which the signal line 31 and the scanning line 32 intersect each other, the pixel 22 is disposed. In FIG. 5, for the simplification of the drawing, a configuration of only four pixels is shown. Each pixel 22 is configured by an n-channel transistor 221, a pixel electrode 222, a common electrode 223 that is disposed to face the pixel electrode 222, a liquid crystal 224 that is interposed between the pixel electrode 222 and the common electrode 223, and an auxiliary capacitor 225. The drain region D of the n-channel transistor 221 is connected to the signal line 31, and the source region S of the n-channel transistor 221 is connected to one electrode between the pixel electrode 222 and the auxiliary capacitor 225. In addition, the gate G of the n-channel transistor 221 is connected to the scanning line 32.

Figure 10:
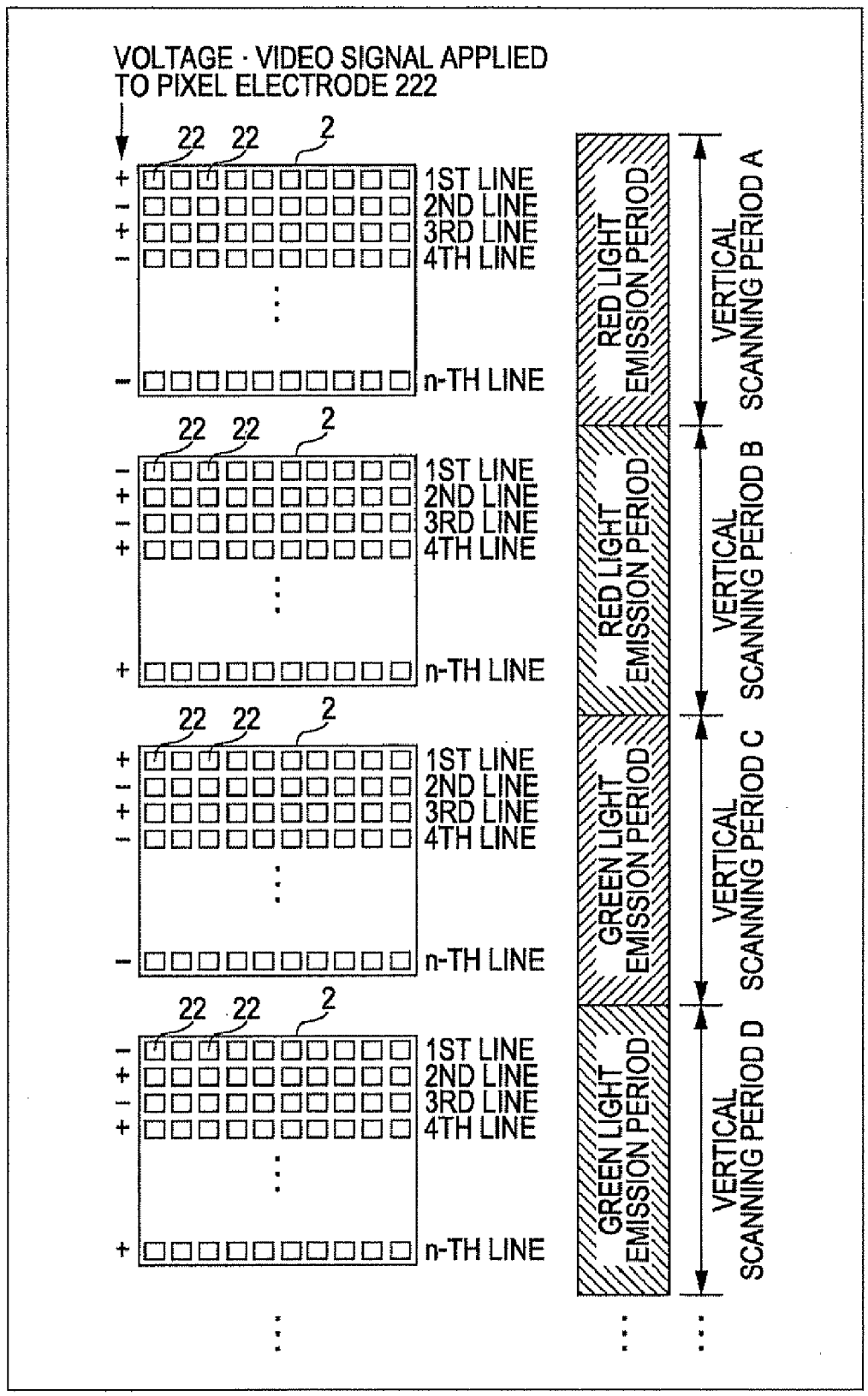
FIG. 10 is a diagram showing the configuration of a pixel according to the second embodiment of the invention.
Figure 11:
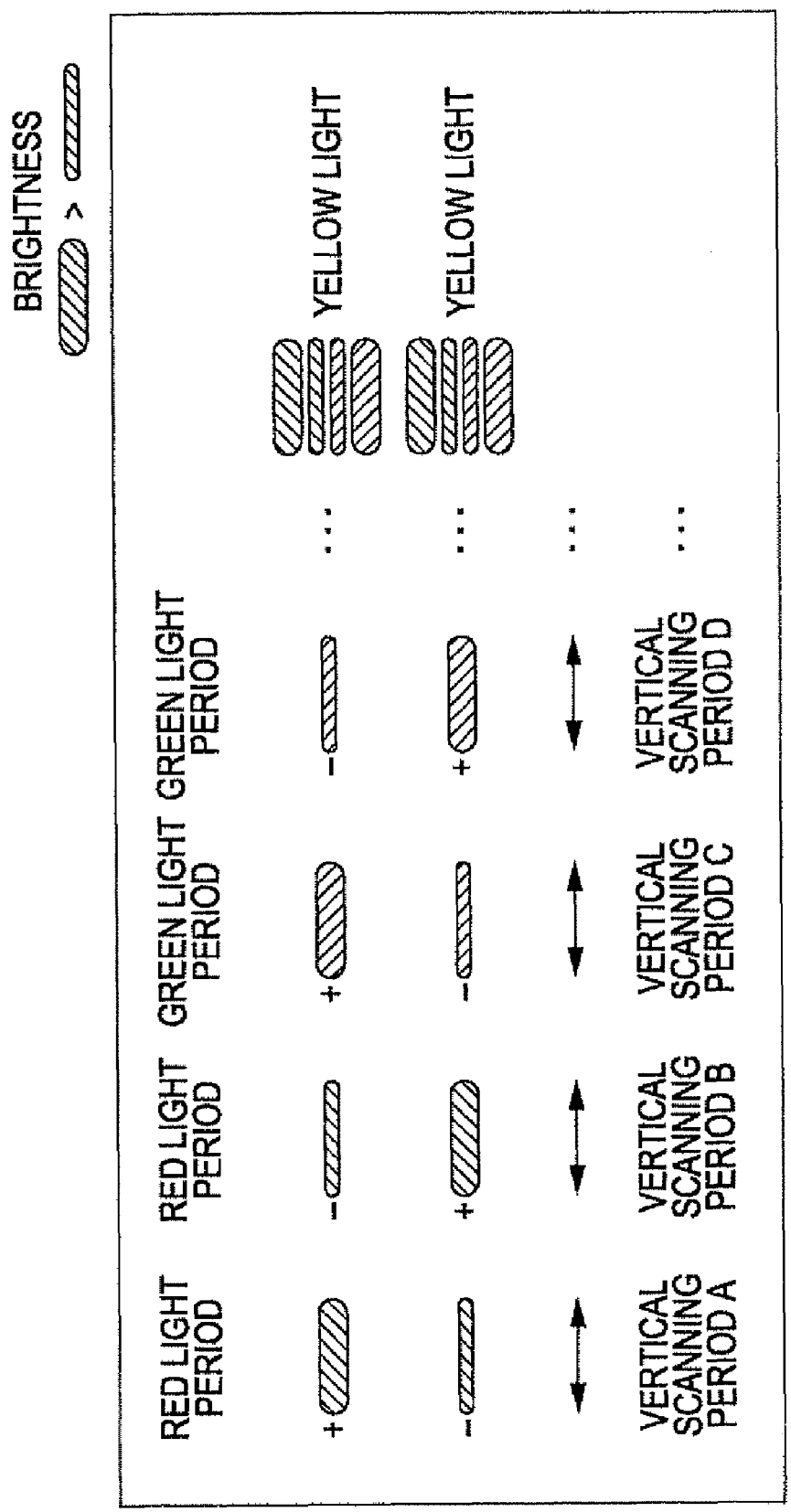
FIG. 11 is a diagram showing the operation of a field-sequential liquid crystal display device according to the second embodiment of the invention.

FIGS. 10 and 11 are diagrams showing the operation of a field-sequential liquid crystal display device according to the second embodiment. Next, the operation of the field-sequential liquid crystal display device 100 according to the second embodiment will be described with reference to FIGS. 1, 8, 10, and 11.

First, as shown in FIG. 1, an analog VIDEO signal is input to the A/D converter 12, and the analog VIDEO signal is converted into digital signals. In addition, horizontal and vertical synchronization signals are input to the PLL circuit 13. Then, the digital signals of RG are stored in the memory 14 in accordance with timing signals, which are generated by the memory timing circuit 16a (see FIG. 8) of the SYNC processor 16, for storing each signal of the red color and the green color in the memory 14. In addition, the VD (vertical synchronization signal) is counted once by the inverting circuit 16b (see FIG. 8) of the SYNC processor 16, and a shift signal is output to the analog driver 15. Accordingly, the application direction of the voltage that is used for driving the liquid crystal 224 can be shifted between the positive (+) side and negative (−) side for each one vertical scanning period.

In addition, timing signals for recording the image data of RG and emission of the LEDs 26 are generated by the SYNC processor 16. The horizontal and vertical control signals and the field-sequential driving control signal are supplied to the display unit 2 through the level shifting circuit 17 based on the timing signals that are generated by the SYNC processor 16. In addition, a voltage to be applied to the common electrode 223 (see FIG. 5) is determined by the common electrode driver 18 so as to be supplied to the display unit 2.

In addition, according to the second embodiment, as shown in FIG. 10, the application direction of the voltage that is applied to the liquid crystal 224 changes for each horizontal line of the plurality of the pixels 22 disposed in the matrix shape. In particular, voltages that shift between the high electric potential and the low electric potential are applied (VIDEO signal) to the pixel electrode 222 (see FIG. 4), and a line-inversion driving process is performed such that the applied voltage is shifted between the positive (+) voltage and the negative (−) voltage with respect to the common electrode 223 for each horizontal line, in addition, to the common electrodes 223 of the pixels 22, a constant voltage is applied.

Next, the operation of the field-sequential liquid crystal display device 100 for a case where an image is displayed in the display unit 2 will be described.

First, as shown in FIG. 10, the positive (+) voltage is applied to the pixel electrodes 222 of the pixels 22 in odd lines (the first line, the third line, etch) among the pixels 22 disposed in the matrix shape, for the vertical scanning period A and the vertical scanning period C. In addition, the negative (−) voltage is applied to the pixel electrodes 222 of the pixels 22 in even lines (the second line, the fourth line, etc.) among the pixels 22 disposed in the matrix shape, for the vertical scanning period A and the vertical scanning period C. On the other hand, the negative (−) voltage is applied to the pixel electrodes 222 of the pixels 22 in odd lines (the first line, the third line, etc.) among the pixels 22 disposed in the matrix shape, for the vertical scanning period B and the vertical scanning period D. In addition, the positive (+) voltage is applied to the pixel electrodes 222 of the pixels 22 in even lines (the second line, the fourth line, etc.) among the pixels 22 disposed in the matrix shape, for the vertical scanning period B and the vertical scanning period D.

As shown in FIG. 4, even when a video signal for a same image is input to the pixel 22, the electric potential difference between a voltage (VIDEO signal) applied to the pixel electrode 222 and a voltage (DCCOM) applied to the common electrode 223 are configured to be different between before and after the application direction of the voltage for driving the liquid crystal 224 changes, due to a difference in the voltage COM (voltage DCCOM) or the like. In particular, the electric potential difference V1 between the voltage DCCOM and the voltage value of the High-side VIDEO signal and an electric potential difference V2 between the voltage DCCOM and the voltage value of the Low-side VIDEO signal are different from each other due to a difference in the voltage COM (voltage DCCOM) or the like. In addition, the electric potential differences V1 and V2 change in accordance with the change of the VIDEO signal or DCCOM. Accordingly, even when the video signal for a same image is input to the pixel 22, the brightness of the color displayed in the pixel 22 changes between before and after the application direction of the voltage for driving the liquid crystal 224 changes. In FIG. 11, for describing this phenomenon, the brightness of the red light and the green light displayed in the display unit 2 (FIG. 10) is denoted by thicknesses of lines. Thus, a thick line represents emission of light that is brighter than that of a thin line. The emission of the red light and the green light displayed in the display unit 2 represents the red light in the pixels 22 of the display unit 2 for the vertical scanning period A (red light emission period). The red light represented in the pixels 22 of odd lines (the first line, the third line, etc.) is bright (the electric potential difference V1 represented in FIG. 4), and the red light represented in the pixels 22 of even lines (the second line, the fourth line, etc.) is dark (the electric potential difference V2 represented in FIG. 4).

Next, for the vertical scanning period B (red light emission period), same as light emission for the vertical scanning period A (red light emission period), red light is displayed in the pixels 22 of the display unit 2. However, the red light displayed in the pixels 22 of odd lines (the first line, the third line, etc.) is dark, and the red light displayed in the pixels 22 of even lines (the second line, the fourth line, etc.) is bright.

Then, for the vertical scanning period C (green light emission period), differently from the light emission for the vertical scanning period B (red light emission period), green light is displayed in the pixels 22 of the display unit 2. The green light displayed in the pixels 22 in odd lines (the first line, the third line, etc.) is bright, and the green light displayed in the pixels 22 in even lines (the second line, the fourth line, etc.) is dark.

Next, for the vertical scanning period D (green light emission period), as light emission for the vertical scanning period C (green light emission period), green light is displayed in the pixels 22 of the display unit 2. The green light displayed in the pixels 22 in odd lines (the first liner the third line, etc.) is dark, and the green light displayed in the pixels 22 in even lines (the second line, the fourth line, etc.) is bright. Thereafter, light emission for the vertical scanning period E (not shown) is the same as that for the vertical scanning period A. As shown in FIG. 11, by displaying the red light and the green light by changing the application direction of the voltage that is used for driving the liquid crystal 224, the brightness of yellow light between before and after the change in the application direction of the voltage is averaged.

According to the second embodiment, as described above, by configuring the LEDs 26 (the LEDs 26*a* and 26*b*) to emit light alternately for each two vertical scanning periods, the application direction of the voltage changes for each one vertical scanning period. Accordingly, between two vertical scanning periods in which one vertical scanning period is repeated, one LED 26 (LED 26*a* or 26*b*) of a same color between the LEDs 26 (LED 26*a* and 26*b*) emits light. Thus, while one LED 26 (the LED 26*a* or 26*b*) of a same color between the LEDs 26 (LEDs 26*a* and 26*b*) emits light, voltages having different application directions are applied. Accordingly, when one LED 26 (LED 26*a* or 26*b*) of a same color between the LEDs 26 (LEDs 26*a* and 26*b*) sequentially emits light, it can be prevented that the application directions of the voltages applied to the liquid crystals 224 of the pixels 22 are the same all the time. As a result, burn-in and a decrease in reproducibility of colors of the liquid crystal 224 can be suppressed.

In addition, according to the second embodiment, as described above, by configuring the LED 26 (LED 26*a* or 26*b*) to emit light is changed for each two vertical scanning periods while the voltage applied to the common electrode 223 is a constant voltage and the voltage applied to the pixel electrode 222 is shifted between the high electric potential and the low electric potential with respect to the voltage applied to the common electrode 223 for each one vertical scanning period, the LED 26 (LED 26*a* or 26*b*) that emits light can be changed for each two vertical scanning periods while DCCOM driving in which the voltage applied to the common electrode 223 is constant and the voltage applied to the pixel electrode 222 is shifted between the high electric potential and the low electric potential is performed. Accordingly, by using the configuration according to the above-described second embodiment, burn-in and a decrease in reproducibility of colors of the liquid crystal 224 in DCCOM driving can be suppressed.

In addition, according to the second embodiment, as described above, by configuring the LED 26 (LED 26*a* or 26*b*) emitting light changed for each two vertical scanning periods with the voltage applied to the common electrode 223 to be shifted between the high electric potential and the low electric potential for each one vertical scanning period, the LED 26 (LED 26*a* or 26*b*) emitting light can be changed for each two vertical scanning periods while ACCOM driving in which the voltages applied to the common electrode 223 and the pixel electrode 222 are shifted between the high electric potential and the low electric potential is performed. Therefore, by using the configuration according to the second embodiment, burn-in and a decrease in reproducibility of colors of the liquid crystal 224 in ACCOM driving can be suppressed.

In addition, according to the second embodiment, as described above, by configuring the LED 26 (LED 26*a* or 26*b*) emitting light changed for each two vertical scanning periods with the application direction of the voltage applied to the liquid crystal 224 changed for each horizontal line of the plurality of the pixels 22 that is disposed in the matrix shape, the LED 26 (LED 26*a* or 26*b*) emitting light can be changed for each two vertical scanning periods while line-inversion driving in which the voltage applied to the liquid crystal 224 is changed for each line. Therefore, by using the configuration according to the second embodiment, burn-in and a decrease in reproducibility of colors of the liquid crystal 224 in line-inversion driving can be suppressed.

Third Embodiment

Figure 12:
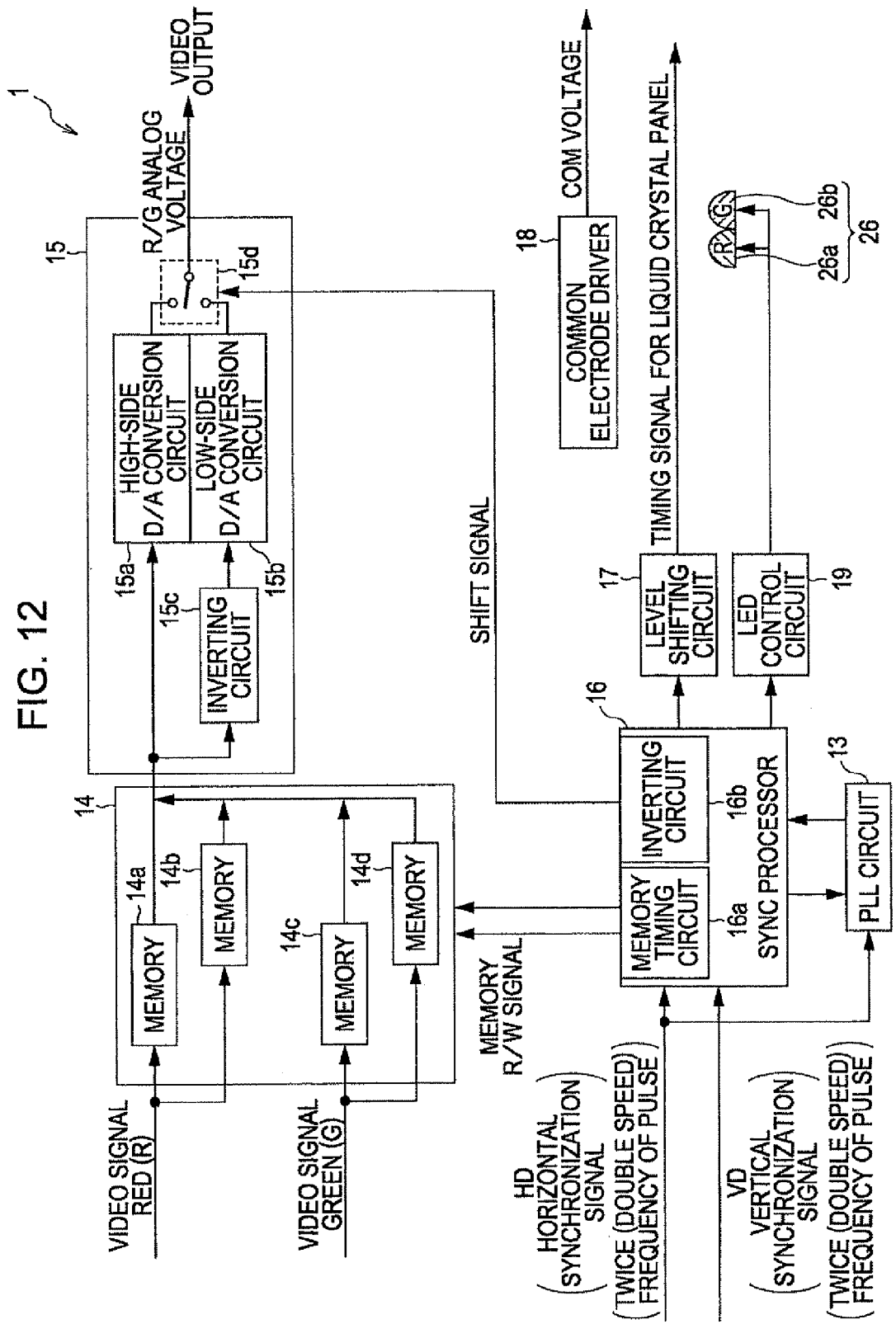
FIG. 12 is a diagram showing a detailed configuration of a liquid crystal display device according to a third embodiment of the invention.
Figure 13:
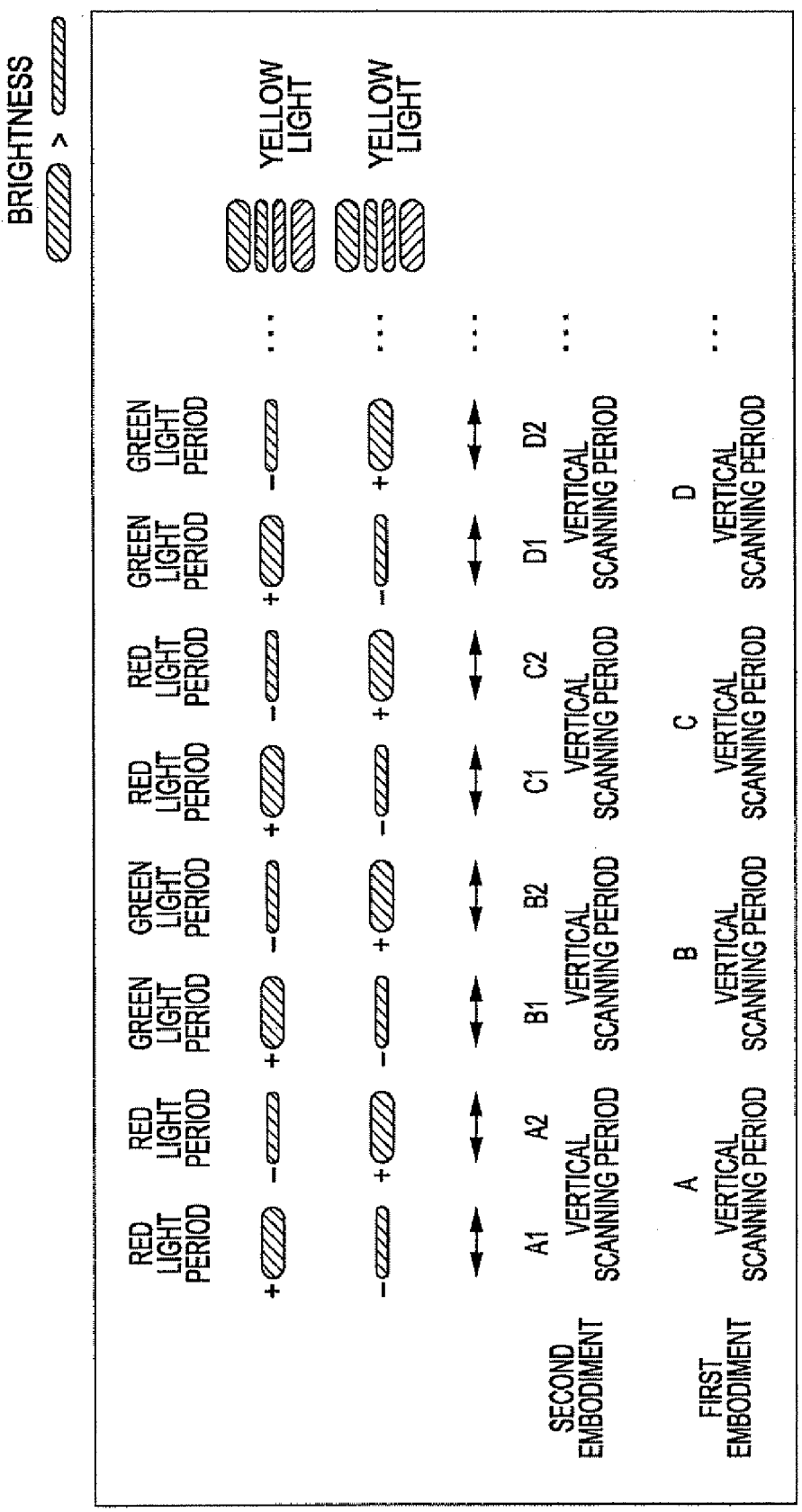
FIG. 13 is a diagram for explaining the operation of a field-sequential liquid crystal display device according to the third embodiment of the invention.

FIG. 12 is a diagram showing a detailed configuration of a liquid crystal display device according to a third embodiment of the invention. FIG. 13 is a diagram for explaining the operation of a field-sequential liquid crystal display device according to the third embodiment of the invention. In this third embodiment, unlike the above-described second embodiment, a case where the frequency of a pulse that is input to the SYNC processor 16 is doubled (double speed) will be described with reference to FIGS. 12 and 13.

Under the configuration of the liquid crystal display device 100 according to this third embodiment, the SYNC processor 16 is configured to receive pulses of twice the frequency (double speed) of the HD (horizontal synchronization signal) and the VD (vertical synchronization signal) that are input to the SYNC processor 16 according to the above-described second embodiment, as inputs.

As shown in FIG. 12, the SYNC processor 16 is configured to generate timing signals for recording the image data of RG and timing signals for light emission of the LEDs 26. The light emission of the LEDs 26 is controlled in accordance with the timing for the field-sequential driving process by the LED control circuit 19 based on the timing signals.

Next, the operation of the field-sequential liquid crystal display device 100 for a case where an image is displayed in the display unit 2 according to the third embodiment will be described.

In the liquid crystal display device 100 according to the third embodiment, as shown in FIG. 12, the HD (horizontal synchronization signal) and the VD (vertical synchronization signal) of twice (double speed) the frequency of those signals according to the second embodiment are input to the SYNC processor 16. The timing signals for recording the image data of RG and timing signals for light emission of the LEDs 26 are generated based on the above-described signals by the SYNC processor 16. Then, the light emission of the LEDs 26 is controlled in accordance with the timing for the field-sequential driving process based on the timing signals by the LED control circuit 19.

In the third embodiment, one vertical scanning period is set to be approximately the same as $1/(60 \cdot n \cdot m)$ (second) where the number of the vertical scanning periods in which a same LED 26 of the LEDs 26 individually emits light is denoted by m and the number of the LEDs 26 is denoted by n. As shown in FIG. 11, in particular, in a case where the number (m) of the vertical scanning periods in which a same LED 26 of the LEDs 26 individually emits light is "1" and the number (n) of the LEDs 26 is "2", one vertical scanning period is a period of $1/(60 \times 1 \times 2) = 1/120$ (second). The light emission period of the LEDs 26 is set to be a period of "1/number of the LEDs 26 that emit light for one vertical scanning period described in the first embodiment" (that is, ½).

During one vertical scanning period of the vertical scanning period A described in the second embodiment, the LEDs 26 corresponding to two vertical scanning periods of the vertical scanning periods A1 and A2 emit light. According to the third embodiment, simultaneously with the light emission, during one vertical scanning period of the vertical scanning period A described in the second embodiment, the application direction of the voltage applied to the liquid crystal 224 corresponding two vertical scanning periods of the vertical scanning periods A1 and A2 is changed. Thereafter, same as the vertical scanning periods A1 and A2, during a period of the vertical scanning periods B1 and B2, the vertical scanning periods C1 and C2, and the vertical scanning periods D1 and D2 that is the same as one vertical scanning period described in the first embodiment, the LEDs 26 corresponding to two vertical scanning periods emit light.

The other configurations of the liquid crystal display device 100 according to the third embodiment are the same as those according to the second embodiment.

According to the third embodiment, as described above, the vertical scanning period in which the LEDs 26 (LEDs 26a and 26b) emit light is set to be the same as one vertical scanning period in a general driving process by setting one vertical scanning period to be approximately the same as $1/(60 \cdot n \cdot m)$ (second), where the number of the vertical scanning periods in which a same LED 26 (LED 26a or 26b) of the LEDs 26 (LEDs 26a and 26b) individually emits light is denoted by m and the number of the even light sources is denoted by n. Accordingly, even when the LEDs 26 (LEDs 26a and 26b) that emit light for each two vertical scanning periods are changed, flickering of a displayed image can be suppressed.

The other advantages of the third embodiment are the same as those of the second embodiment.

Figure 14:
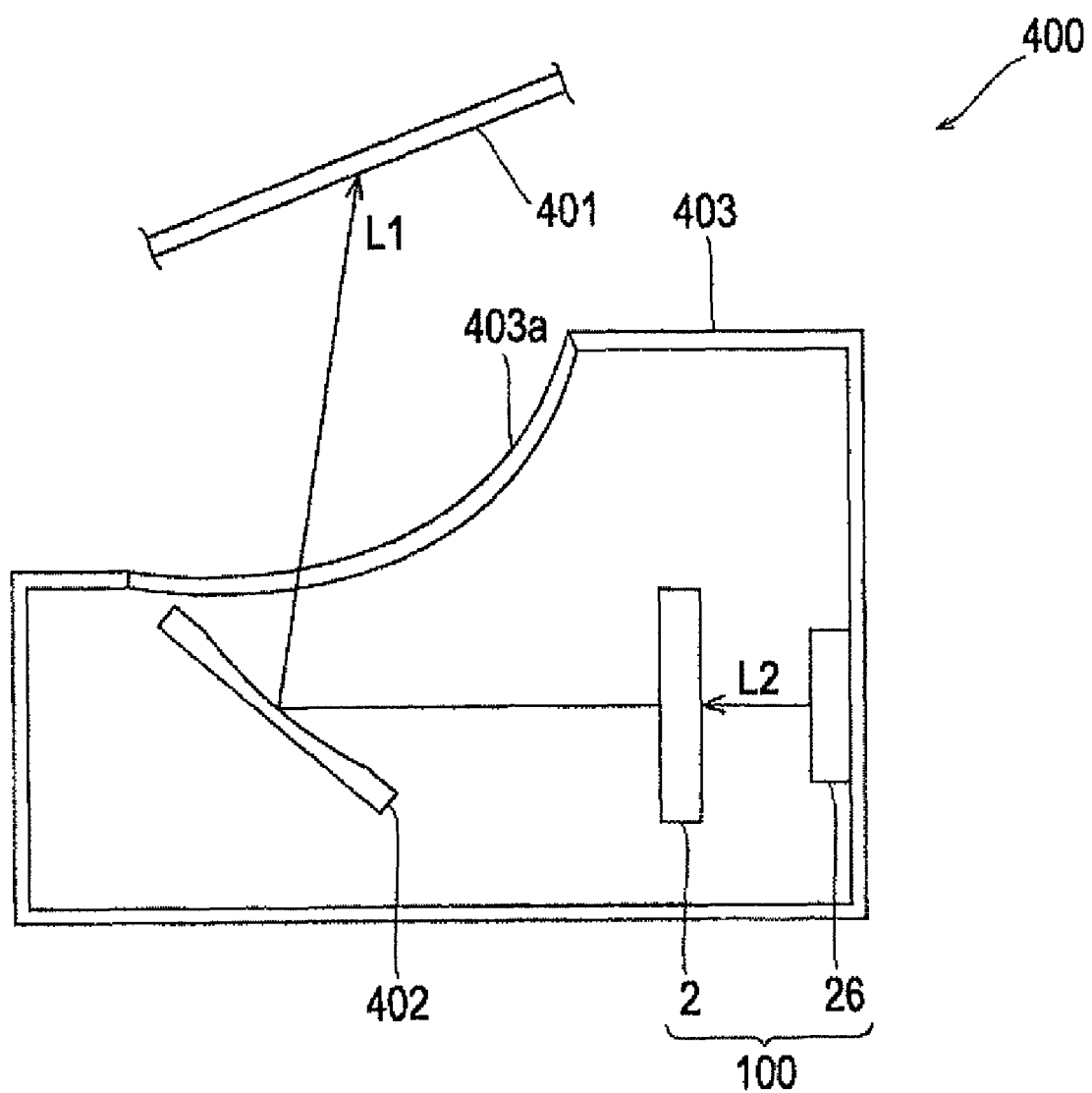
FIG. 14 is a diagram for explaining a head-up display using a liquid crystal display device according to an embodiment of the invention.

The liquid crystal display device 100 according to an embodiment of the invention, as shown in FIG. 14, can be used in a head-up display 400. The liquid crystal display device 100 is installed to a predetermined device such that display light L1 can be projected onto a display medium (for example, front glass of a vehicle) 401. In particular, the liquid crystal display device 100 includes a display unit 2 and an LED 26. The display unit 2 is interposed between the LED 26 and a concave mirror 402. The light L2 emitted from the LED 26 is incident to the display unit 2, and thereby the display light L1 output from the liquid crystal display device 100 is generated.

Figure 15:
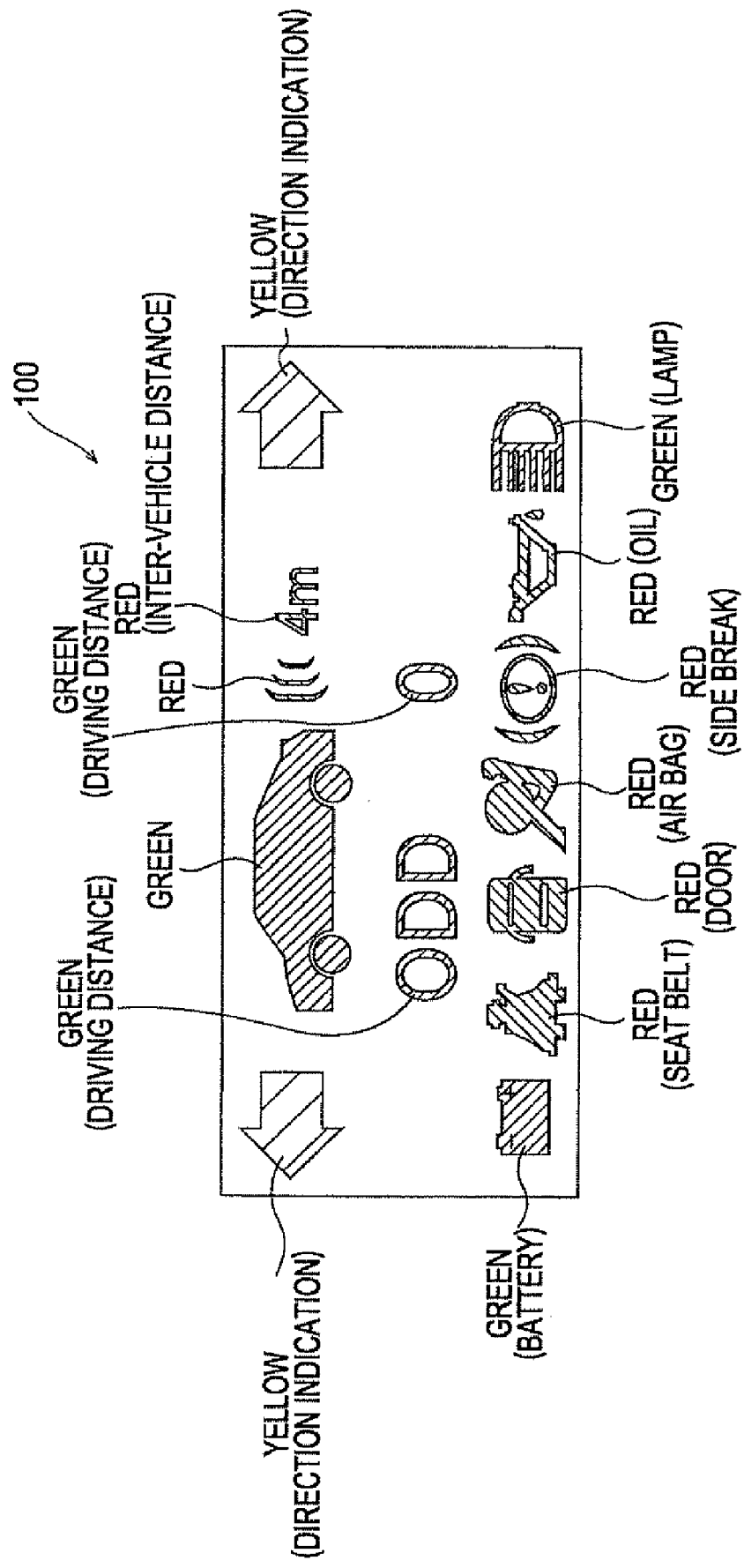
FIG. 15 is a diagram for explaining a head-up display using a liquid crystal display device according to an embodiment of the invention.

The display light L1 output from the liquid crystal display device 100 is reflected to the display medium 401 side by the concave mirror 402 and is projected onto the display medium 401. In addition, the liquid crystal display device 100 and the concave mirror 402 are housed in a case 403 having a window part 403a for transmitting the display light L1. The in-car head-up display 400, as shown in FIG. 15, is used for display of information (for example, direction indication, inter-vehicle distance, driving distance, various warning information, road information and road guide information, information on an obstacle such as a person or an object, or the like) that is needed for driving a vehicle. In the display of such information, unlike display of a natural image, the number of colors used for display may be small. Since the liquid crystal display device 100 according to an embodiment of the invention is a display device in which a red color, a green color, and an additive color mixture of red and green colors can be displayed, the liquid crystal display device 100 can be used in the head-up display 400 very appropriately.

The embodiment disclosed here are examples in every aspect and should not be considered for purpose of limitation. The scope of the invention is defined not by the description of the embodiments as above but by the claims and further includes various changes within the scope of the claims and equivalent meaning and an equivalent scope thereto.

For example, as an example of the invention, a case in which the even light sources use light of two colors including the red color (R) and the green color (G) has been described. However, the invention is not limited thereto, and four colors or the like other than two colors may be applied as long as the number of the light sources is even.

In addition, according to the above-described embodiments, as an example of the invention, a case where two vertical scanning periods are used as even vertical scanning periods has been described. However, the invention is not limited thereto and may be applied to four vertical scanning periods or the like other than two vertical scanning periods as long as the number of the vertical scanning periods is even.

In addition, as an example of the light source of the invention, a case where LEDs emitting light of the red color (R) and the green color (G) are used has been described. However, the invention is not limited thereto, and the light source may be configured by a combination of a red color (R) and a blue color (B) or a combination of a green color (G) and a blue color (B).

In addition, as an example of the light source of the invention, a case where LEDs emitting light of a red color (R) and a green color (G) are used has been described. However, the invention is not limited thereto, and LEDs emitting light of cyan, magenta, and yellow colors may be used. In such a case, a color image can be displayed in an easy manner by additive color mixing.

In addition, in the above-described embodiments, an example in which the voltage applied to the pixel electrode of the pixel is applied by using a line-inversion driving method has been described. However, the invention is not limited thereto. Thus, a different inversion driving method such as frame inversion driving, source inversion driving, dot inversion driving, or the like may be used.

In addition, as an example of the light source of the invention, a case where the LEDs are used has been described. However, the invention is not limited thereto, and, for example, a light emitting body such as an organic EL may be used.

The present invention contains subject matter related to Japanese Patent Application Nos. 2008-055590 and 2008-055602 filed in the Japanese Patent Office on Mar. 5, 2008, the entire contents of which are incorporated herein by reference.

What is claimed is:

1. A liquid crystal display device comprising:
    pixels each including a liquid crystal and a pixel electrode and a common electrode that are used for applying a voltage to the liquid crystal;
    a display unit in which a plurality of the pixels is disposed in a matrix shape; and
    even light sources, wherein
    the pixels are driven in accordance with sequential light emission of the even light sources, and the application direction of a voltage for driving the liquid crystal is changed for each of vertical scanning periods corresponding to the number of the even light sources, and
    each of the vertical scanning periods is set to be the same as $1/(60 \cdot m \cdot n)$ (second) where the number of the vertical scanning periods in which the same light source among the even light sources individually emits light is denoted by m and the number of the even light sources is denoted by n.

2. The liquid crystal display device according to claim 1, wherein the even light sources include a first light source that emits light of a first color and a second light source that emit light of a second color that is different from the first color, and
    wherein a period in which the first light source and the second light source sequentially emit light once is set as one unit period, and the application direction of the voltage for driving the liquid crystal is changed for each unit period.

3. The liquid crystal display device according to claim 2, wherein the colors of light emitted by the first light source and the second light source are different colors selected from among red, green, and blue colors.

4. The liquid crystal display device according to claim 1,
    wherein a voltage applied to the common electrode is a constant voltage, and
    wherein the voltage applied to the pixel electrode is shifted between a high electric potential and a low electric potential with respect to the voltage applied to the common electrode for each of the vertical scanning periods corresponding to the number of the even light sources.

5. The liquid crystal display device according to claim 1, wherein the voltage applied to the common electrode is shifted between a high electric potential and a low electric potential for each of the vertical scanning periods corresponding to the number of the even light sources.

6. The liquid crystal display device according to claim 1, wherein the application direction of the voltage applied to the liquid crystal is changed for each horizontal line of the plurality of the pixels that is disposed in the matrix shape.

7. A head-up display comprising the liquid crystal display device according to claim 1.

8. A liquid crystal display device comprising:
    pixels each including a liquid crystal and a pixel electrode and a common electrode that are used for applying a voltage to the liquid crystal;
    a display unit in which a plurality of the pixels is disposed in a matrix shape; and
    even light sources, wherein
    the pixels are driven in accordance with sequential light emission of the even light sources,
    the application direction of the voltage applied to the liquid crystal is changed for each one vertical scanning period, and the light sources emitting light are changed for each of even vertical scanning periods, and
    the one vertical scanning period is set to be the same as $1/(60 \cdot m \cdot n)$ (second) where the number of the vertical scanning periods in which the same light source among the even light sources individually emits light is denoted by m and the number of the even light sources is denoted by n.

9. The liquid crystal display device according to claim 8,
    wherein the even light sources include a first light source that emits light of a first color and a second light source that emits light of a second color different from the first color, and
    wherein, the application direction of the voltage applied to the liquid crystal is changed for each one vertical scanning period, and the first light source and the second light source alternately emit light for each of even vertical scanning periods.

10. The liquid crystal display device according to claim 9, wherein colors of light emitted by the first light source and the second light source are different colors selected from among red, green, and blue colors.

11. The liquid crystal display device according to claim 8,
    wherein the voltage applied to the common electrode is a constant voltage, and
    wherein the light sources emitting light are changed for each of even vertical scanning periods while the voltage applied to the pixel electrode is shifted between a high electric potential and a low electric potential with respect to the voltage applied to the common electrode for each one vertical scanning period.

12. The liquid crystal display device according to claim 8, wherein the light sources emitting light are changed for each of even vertical scanning periods while the voltage applied to the common electrode is shifted between a high electric potential and a low electric potential for each one vertical scanning period.

13. The liquid crystal display device according to claim 8, wherein the light sources emitting light are changed for each of even vertical scanning periods while the application direction of the voltage applied to the liquid crystal is changed for each horizontal line of the plurality of the pixels that is disposed in the matrix shape.

14. A head-up display comprising the liquid crystal display device according to claim 8.

* * * * *